United States Patent

Handschy et al.

Patent Number: 5,748,164
Date of Patent: May 5, 1998

[54] ACTIVE MATRIX LIQUID CRYSTAL IMAGE GENERATOR

[75] Inventors: Mark A. Handschy, Boulder; Michael R. Meadows, Nederland, both of Colo.

[73] Assignee: Displaytech, Inc., Longmont, Colo.

[21] Appl. No.: 362,665

[22] Filed: Dec. 22, 1994

[51] Int. Cl.$^6$ .................................................. G09G 3/36
[52] U.S. Cl. ........................... 345/89; 345/87; 345/84
[58] Field of Search .............................. 345/89, 100, 102, 345/152, 206, 90, 91, 92, 97, 87, 84; 359/59, 55, 72, 56; 349/41, 42, 43, 25

[56] References Cited

U.S. PATENT DOCUMENTS

| | | | |
|---|---|---|---|
| 4,090,219 | 5/1978 | Ernstoff | 358/59 |
| 4,709,995 | 12/1987 | Kuribayashi et al. | 345/89 |
| 4,864,290 | 9/1989 | Waters | 345/89 |
| 4,922,240 | 5/1990 | Duwaer | 345/100 |
| 4,941,735 | 7/1990 | Moddel et al. | 359/56 |
| 4,969,119 | 11/1990 | Stewart | 350/333 |
| 4,978,952 | 12/1990 | Irwin | 345/102 |
| 5,061,049 | 10/1991 | Hornbeck | 359/224 |
| 5,073,010 | 12/1991 | Johnson et al. | 359/72 |
| 5,083,857 | 1/1992 | Hornbeck | 359/291 |
| 5,093,652 | 3/1992 | Bull et al. | 345/88 |
| 5,096,279 | 3/1992 | Hornbeck | 359/230 |
| 5,122,791 | 6/1992 | Gibbons et al. | 345/89 |
| 5,128,782 | 7/1992 | Wood | 309/48 |
| 5,146,356 | 9/1992 | Carlson | 349/43 |
| 5,157,524 | 10/1992 | Dijon et al. | 345/89 |
| 5,170,156 | 12/1992 | DeMond et al. | 345/85 |
| 5,189,406 | 2/1993 | Humphries et al. | 345/97 |
| 5,192,946 | 3/1993 | Thompson et al. | 345/150 |
| 5,206,629 | 4/1993 | DeMond et al. | 345/98 |
| 5,214,420 | 5/1993 | Thompson et al. | 345/6 |
| 5,233,447 | 8/1993 | Kuribayashi et al. | 345/97 |
| 5,254,980 | 10/1993 | Hendrix et al. | 345/84 |
| 5,255,100 | 10/1993 | Urbanus | 348/441 |
| 5,278,652 | 1/1994 | Urbanus et al. | 345/200 |
| 5,280,277 | 1/1994 | Hornbeck | 345/108 |

(List continued on next page.)

FOREIGN PATENT DOCUMENTS 0287034 4/1988 European Pat. Off.

OTHER PUBLICATIONS

J. C. White, "Colour LCD TV", May 1988, Physics in Technology, vol. 19, No. 3, pp. 91–100.

L.K. Cotter, T.J. Drabik, R.J. Dillon and M.A. Handschy; "Ferroelectric–Liquid–Crystal Silicon–Integrated–Circuit Spatial Light Modulator"; Mar. 1, 1990; Opt. Lett. 15, 191.

I. Underwood, et al.; "A High Performance Spatial Light Modulator"; Jul. 21, 1991; SPIE vol. 1562, 107.

(List continued on next page.)

*Primary Examiner*—Steven Saras
*Assistant Examiner*—John Suraci
*Attorney, Agent, or Firm*—Stephen C. Shear; Jay Beyer

[57] ABSTRACT

A system for producing spatially modulated monochrome or color light having gray scale includes an active matrix liquid crystal spatial light modulator having light modulating means including (i) a layer of ferroelectric liquid crystal material which is designed to switch between ON and OFF states and (ii) active matrix means including VLSI circuitry for dividing the layer of liquid crystal material into an array of individual liquid crystal pixels and for causing each of the pixels of liquid crystal material to modulate light individually by switching between the ON and OFF states in a way that depends upon the data which the VLSI circuitry is written. The system also includes illumination means having a light source for directing light from the source into the pixel-divided layer of ferroelectric liquid crystal material in a specific way. And finally, the system includes means for writing the VLSI circuitry with preselected data in accordance with a particular data ordering scheme such that the circuitry, in response to the written data, causes the pixels of liquid crystal material to individually switch between their ON and OFF states and therefore modulate light from the source in a way which, depending upon the data, produces a specific overall pattern of gray scale light.

57 Claims, 6 Drawing Sheets

U.S. PATENT DOCUMENTS

| | | | |
|---|---|---|---|
| 5,298,915 | 3/1994 | Bassetti, Jr. | 345/152 |
| 5,303,055 | 4/1994 | Hendrix et al. | 348/675 |
| 5,339,090 | 8/1994 | Crossland et al. | 345/90 |
| 5,339,116 | 8/1994 | Urbanus et al. | 345/108 |
| 5,359,345 | 10/1994 | Hunter | 345/83 |
| 5,365,283 | 11/1994 | Doherty et al. | 348/520 |
| 5,383,041 | 1/1995 | Yamazaki et al. | 345/206 |
| 5,384,649 | 1/1995 | Takimoto et al. | 349/25 |
| 5,444,557 | 8/1995 | Spitzer et al. | 359/59 |
| 5,461,397 | 10/1995 | Zhang et al. | 345/102 |
| 5,483,307 | 1/1996 | Anderson | 359/630 |
| 5,497,172 | 3/1996 | Doherty et al. | 345/85 |
| 5,499,062 | 3/1996 | Urbanus | 345/84 |
| 5,500,538 | 3/1996 | Yamazaki et al. | 349/41 |
| 5,506,597 | 4/1996 | Thompson et al. | 345/85 |
| 5,519,520 | 5/1996 | Stoller | 345/89 |
| 5,523,803 | 6/1996 | Urbanus et al. | 345/197 |
| 5,523,864 | 6/1996 | Gaalema et al. | 359/55 |
| 5,589,852 | 12/1996 | Thompson et al. | 345/85 |

OTHER PUBLICATIONS

W.A. Crossland, M.J. Birch, A.B. Davey and D.G. Vass; "Active Backplane Spatial Light Modulators Using Chiral Smectic Liquid Crystals"; Feb. 9, 1992; SPIE vol. 1665, 114.

Ian Underwood, David G. Vass, Antony O'Hara, Dwayne C. Burns, Peter W. McOwan and James Gourlay; "Improving the Performance of Liquid-Crystal-Over-Silicon Spatial Light Modulators: Issues and Achievements"; May 10, 1994; Applied Optics 33, 2768.

E.V. Stine and M. Chmielowski; "High-Refresh-Rate Color Sequenced LCD"; Jun. 14, 1994; SID Digest of Technical Papers 25, 544.

J.B. Sampsell; "An Overview of the Performance Envelope of Digital-Micromirror-Device-Based Projection Display Systems"; Jun. 14, 1994; SID Digest of Technical Papers 25,669.

ACTIVE MATRIX LIQUID CRYSTAL IMAGE GENERATOR

GOVERNMENT CONTRACT CLAUSE

This invention was made with Government support under contracts NAS9-18858 and NAS9-19102 awarded by the National Aeronautics and Space Administration and contracts DAA-H01-92-C-R275 and DAA-H01-94-C-R154 awarded by the Advanced Research Projects Agency. The Government has certain rights in this invention.

BACKGROUND OF THE INVENTION

The present invention relates generally to display systems, and more particularly to a miniature display system in which a ferroelectric liquid crystal (FLC) spatial light modulator is positioned directly on top of and controlled by a specifically written (i.e. addressed) very-large-scale-integration (VLSI) silicon integrated circuit (IC) backplane.

In the field of miniature displays and especially those using spatial light modulators, it is well known that stationary and moving images, either monochrome or color, may be sampled and both color separated and gray scale separated. These separations may be digitized forming digitized images which correspond to the given images. These digitized images are used by devices in this field to create visual images that can be used for a direct visual display, a projected display, a printer device, or for driving other devices that use visual images as their input. The present invention provides a novel spatial light modulator using novel data sequencing schemes which may be used to produce a direct view miniature display or a projected display, or for driving a printer or other devices that use visual images as their input.

One of the ongoing challenges facing the manufacture of miniature display systems is providing smaller and smaller displays with higher and higher resolution. The combination of these two factors dictates smaller and smaller pixel sizes in order to achieve smaller displays with higher resolution. Miniature displays which are small enough to be mounted onto a helmet or displays small enough to be supported by a pair of eyeglasses will find a wide variety of uses if they can provide adequate resolution and brightness in a small, low-power package at a low cost. Conventional display technologies such as CRTs are difficult to miniaturize and therefore do not hold much promise in this field. Alternatively, new displays based on VLSI integrated circuits are currently being developed. Examples of these miniature displays in the prior art include digital micromirror devices, active-matrix electroluminescent displays, and active-matrix liquid crystal displays. However, each of these prior art devices has significant limitations in resolution, brightness, compactness, lumination efficiency, or color capability. Furthermore, because of various physical restrictions on systems of these types, the smallest pixel pitch that to applicant's knowledge has been achievable thus far has been a pitch much greater than 10 microns. As will be seen hereinafter, the present invention provides a display capable of providing smaller pixels, for example with a pitch on the order of 10 microns or less, with higher resolution in a bright, full color capable display. As will also be seen, the present invention provides for unique data ordering schemes, and a unique method of illuminating the display, as well as other features which will become apparent.

SUMMARY OF THE INVENTION

As will be described in more detail hereinafter, a system for producing modulated monochrome or color light having gray scale is disclosed. The system includes an active matrix liquid crystal spatial light modulator having light modulating means including (i) a layer of ferroelectric liquid crystal material which is designed to switch between ON and OFF states and (ii) active matrix means including VLSI circuitry for dividing the layer of liquid crystal material into an array of individual liquid crystal pixels and for causing each of the pixels of liquid crystal material to modulate light individually by switching between the ON and OFF states in a way that depends upon the data with which the VLSI circuitry is written. The system also includes illumination means having a light source for directing light from the source into the pixel-divided layer of ferroelectric liquid crystal material in a specific way. And finally, the system includes means for writing the VLSI circuitry with preselected data in accordance with a particular data ordering scheme such that the circuitry, in response to the data, causes the pixels of liquid crystal material to individually switch between their ON and OFF states and therefore modulate light from the source in a way which, depending upon the data, produces a specific overall pattern of gray scale light.

In accordance with one feature of the present invention, simplified VLSI circuitry, specifically circuitry using a single active component per pixel, is combined with a very thin layer of ferroelectric liquid crystal material, approximately one micron thick, to produce a spatial light modulator for a display in which the spatial light modulator is comprised of extremely small pixels. This feature of the present inventions allows a spatial light modulator with a pixel pitch of 10 microns or less to be produced. In a specific embodiment disclosed herein, the spatial light modulator includes a thin layer of ferroelectric liquid crystal confined between a silicon VLSI circuitry backplane and a glass window coated on its inner side with a transparent electrode layer of indium-tin oxide. The VLSI backplane includes an array of conductive metal pads positioned on the upper surface of the VLSI backplane. The conductive metal pads each have a reflective top surface which is designed to reflect light directed into the spatial light modulator back out of the spatial light modulator and also act as electrodes controlled by the data writing means. The conductive metal pad electrodes and the transparent electrode layer are positioned on opposite sides of the ferroelectric liquid crystal layer and are used to form electric fields through the layer of individually controllable ferroelectric liquid crystal pixels whose positions correspond to the positions of the conductive metal pad electrodes.

In accordance with another feature, different very specifically configured data ordering schemes compatible with the simplified VLSI circuitry are utilized in order to achieve controllable gray scale. Each of these data ordering schemes contemplates first establishing a particular frame rate for the display system. Each of these frames is then divided into a plurality of subframes for purposes of obtaining monochromatic gray scale in the case of a monochromatic display or subframes for purposes of obtaining color and subsubframes for obtaining color gray scale in the case of a color display.

In accordance with one data ordering scheme, the gray scale of any given pixel is obtained by dividing each frame into subframes of time periods, preferably time periods of unequal length, while maintaining the light directed into the modulator at a fixed brightness and by either turning ON or OFF the particular pixel during certain subframes of the frame such that the cumulative time in which the pixel is ON during the frame is proportional to the desired gray scale for that pixel. Alternatively, in accordance with a second data ordering scheme, the gray scale of any given pixel is obtained by dividing each frame into subframes of equal time periods and by turning ON or OFF the particular pixel during certain subframes of the frame while at the same time changing the brightness of light directed into the spatial light modulator for the different subframes. The cumulative time in which the pixel is ON, in combination with the brightness of the light during each subframe, is proportional to the desired gray scale for that pixel. A third scheme is a combination of the first scheme and the second scheme. In each of these schemes, because of the frame rate, the viewer's eye perceives the time integral of brightness of each pixel for each frame, thereby perceiving the desired gray scale image. In both of these second and third data ordering schemes, additional blackout subframes are provided in accordance with the present invention in order to maintain the fidelity of the ultimately produced display.

In accordance with another feature of the present invention, the three different data ordering schemes are utilized in order to achieve a color display with gray scale for each color. This is done by establishing a particular frame rate for the display system and dividing the frames into a plurality of subframes for purposes of obtaining color. During each of these subframes light of a certain color is directed into the spatial light modulator. The subframes are further divided into a plurality of sub-subframes for purposes of obtaining gray scale for each color subframe, as indicated above. In all three of these color schemes, blackout subframes and/or blackout sub-subframes may be used. In accordance with still another feature of the present invention, individual light emitting diodes are used as color light sources for a color display.

In accordance with a more general embodiment of the present invention, a system for producing modulated light is disclosed including a spatial light modulator having an array of individual light modulating pixels. Each pixel includes a light modulating medium which is designed to switch between ON and OFF light modulating states for modulating light depending upon the pixels light modulating state, and means for switching the pixels associated light modulating medium between the medium's ON and OFF states in response to and dependent on externally generated, preselected data signals. In one example of this embodiment, the modulating medium is ferroelectric liquid crystal which is switched using a digital approach from between only a fully ON and a fully OFF state. In a second example of this embodiment the modulating medium is nematic liquid crystal which is controllably switched using an analog approach to a fully ON state, a fully OFF state, or any partially ON state. The system also includes means for generating a stream of the preselected data signals and means for applying the preselected data signals to the switching means associated with each of the pixels during each one of a series of successive time periods such that (i) for any given successive time period, all of the pixels are first caused to modulate light depending upon the states of their respective light modulating mediums and responsive to the data signals applied to the light modulating mediums during the given period, and (ii) thereafter during certain ones of the time periods, the entire array of pixels are switched to the OFF state, all at the same time, whereby to provide a pixel blackout subperiod during each of the certain time periods.

BRIEF DESCRIPTION OF THE DRAWINGS

The features of the present invention may best be understood by reference to the following description of the presently preferred embodiments together with the accompanying drawings in which.

DETAILED DESCRIPTION OF THE PREFERRED EMBODIMENTS

Figure 1:
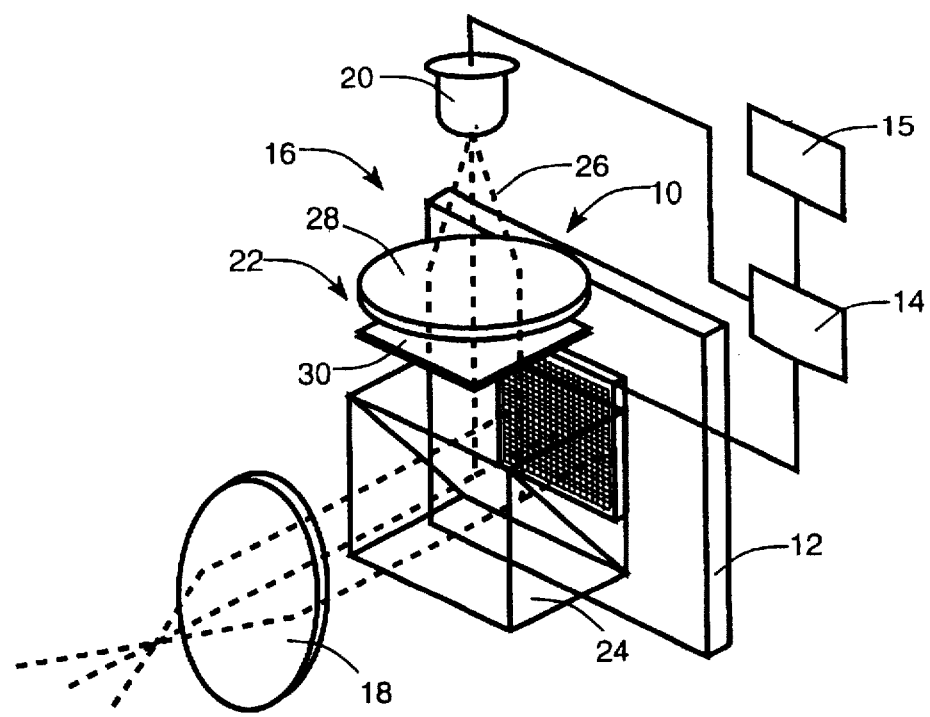
FIG. 1 is a diagrammatic perspective view of a miniature display system designed in accordance with the present invention.

Referring initially to FIG. 1, a preferred embodiment of a miniature display system designed in accordance with the present invention and generally designated by reference numeral 10 is illustrated. As will be described in more detail hereinafter, the display system includes a ferroelectric liquid crystal VLSI (FLC/VLSI) spatial light modulator 12; a data writing arrangement 14 for controlling FLC/VLSI spatial light modulator 12; a video or digitized image source 15 which creates or provides, as an input to data writing arrangement 14, digitized images; an illumination arrangement generally designated by reference numeral 16 for illuminating spatial light modulator 12; and an appropriately designed readily available viewing eyepiece lens 18. As will also be described in more detail hereinafter, FLC/VLSI spatial light modulator 12 includes an array of individually addressable pixels, not shown in FIG. 1, designed to be switched by data writing arrangement 14 between ON (light) and OFF (dark) states. Illumination arrangement 16 includes a light source 20 which may be switchably controlled by data writing arrangement 14, a collimating arrangement 22, and a polarizer/analyzer 24.

Still referring to FIG. 1, either unpolarized or polarized light, generated by light source 20 in the form of light rays 26 is collected by collimating arrangement 22 and directed into polarizer/analyzer 24. The polarizer/analyzer 24 causes light of a particular polarization state, for example S-polarized light, to be directed into FLC/VLSI spatial light modulator 12 while any light of the opposite polarization state, for example P-polarized light is lost. The polarized light directed into FLC/VLSI spatial light modulator 12 is reflected back to polarizer/analyzer 24 by the individual pixels of the spatial light modulator with the light's polarization state being either maintained (for example S-polarized) or changed (for example P-polarized) depending on the ON/OFF state of the individual pixels of FLC/VLSI spatial light modulator 12. For the pixels which are in the ON state, the polarization of the light is changed by the FLC which allows the light to pass through polarizer/analyzer 24 into eyepiece lens 18 presenting a bright pixel in the array of pixels to a viewer of the display. For the pixels which are in the OFF state, the light's polarization is maintained, causing the polarizer/analyzer 24 to direct the light back up toward the light source or away from eyepiece lens 18, thereby presenting a dark pixel to the viewer. Thus, at any particular instant in time, when a given pixel is fully OFF or ON, it is as dark as it can be (OFF) or as bright as it can be (ON). Therefore, in order to obtain gray scale, it is necessary to modulate or switch the pixels between the OFF and ON states in a binary fashion, as will be seen hereinafter.

Although the system described above utilizes a polarizer/analyzer to polarize the light, it should be understood that this is not a requirement of the present invention. Instead, the present invention contemplates utilizing polarized light which would eliminate the need for a polarizer. Therefore, the present invention would apply regardless of whether polarized or unpolarized light is directed into the spatial light modulator of the present invention.

Still referring to FIG. 1, the various components of illuminator arrangement 16 will now be described in detail. As was mentioned above, in the presently preferred embodiment of the present invention, illuminator arrangement 16 includes polarizer/analyzer 24. In this particular embodiment, polarizer/analyzer 24 is a polarizing beam splitting (PBS) cube designed to function over a wide spectrum of light such that it retains its polarizing and analyzing characteristics for substantially the entire visible light spectrum. In the embodiment illustrated in FIG. 1, light from light source 20 is directed down into PBS cube 24 which reflects only the light having a specific polarization into FLC/VLSI spatial Light modulator 12.

Light not having the specific polarization is allowed to pass through the PBS cube and is not directed into the modulator. In this embodiment, the PBS cube also acts as the analyzer for the light reflected back out from spatial light modulator 12. As described above, if the polarization of the light has been changed by the FLC it is allowed to pass through the PBS cube into eyepiece 18 forming a bright pixel. If it has not been changed by the FLC the light is reflected back up toward light source 20, thus presenting a dark pixel to the viewer.

Although the polarizer/analyzer has been described as a polarizing beam splitting cube for the embodiment shown in FIG. 1, it should be understood that the polarizer/analyzer may take on a wide variety of forms. For instance, depending on the configuration of the display, the polarizer/analyzer may be provided in the form of three separate components, one for polarizing the light, one for directing it into the modulator, and one for analyzing the light directed out from the modulator as described above. Also, the polarizer/analyzer has been described as operating over a wide spectrum of light. This is not a requirement of the present invention and for instance would not be necessary for a monochrome display which only made use of a certain color of light. However, in the case of color, it has been specifically selected to act upon the entire visible spectrum and therefore overall system 10 requires but a single polarizer/analyzer regardless of the number of discrete colors utilized.

As mentioned above, illumination arrangement 16 includes collimating arrangement 22. FIG. 1 depicts collimating arrangement 22 as being a collimating lens 28 and an illuminance profile filter 30 for producing uniform lumination. These components may take on a wide variety of forms including novel optical systems disclosed in copending U.S. patent application Ser. No. 08/362,234 Attorney Docket Number DIS1P005 entitled OPTICS ARRANGEMENTS INCLUDING LIGHT SOURCE ARRANGEMENTS FOR AN ACTIVE MATRIX LIQUID CRYSTAL IMAGE GENERATOR filed cotemperaneously herewith, which application is incorporated herein by reference.

Figure 2:
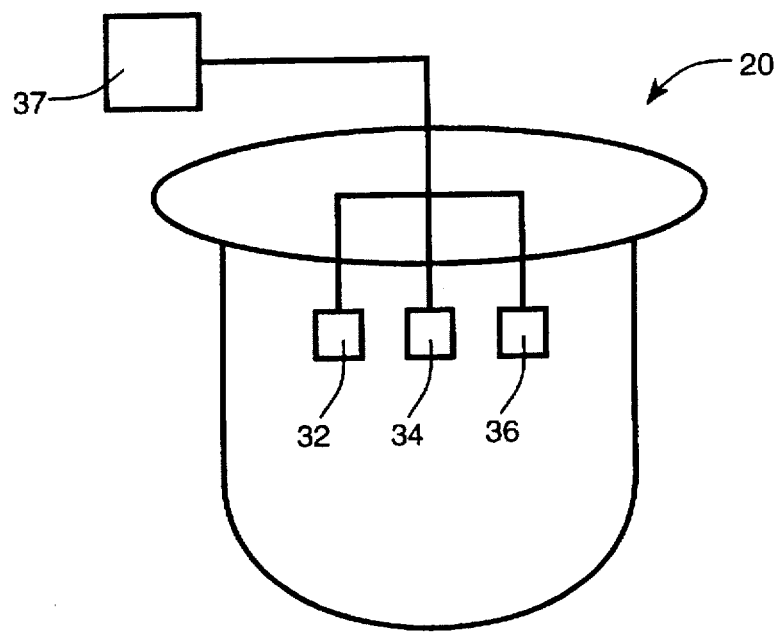
FIG. 2 is a diagrammatic view illustrating one preferred embodiment of a light source forming part of the display system shown in FIG. 1.

Referring now to FIG. 2, light source 20 will be described in detail. Light source 20 may take a wide variety of forms depending on the desired overall display system requirements, in particular, color and brightness requirements. In one preferred embodiment of the present invention, for a color version of the miniature display system, light source 20 includes three light emitting diodes (LEDs), a red LED 32, a green LED 34, and a blue LED 36. Each of these LEDs may be turned ON and OFF individually and may be turned ON with controllable brightness in which case a variable power supply generally designated at 37 is provided. Alternatively, as shown in FIG. 1 light source 20 may be made up of a single LED package containing a plurality of LED die including one or more die of at least two different colors, each of the colors of die being individually switchable and having a controllable brightness. As mentioned above, these colors would typically be red, green, and blue and each would generate an appropriate wavelength of light to allow the mixing of these colors to produce the broadest range of colors possible. By selecting the specific colors of the LED die, the overall color spectrum available in the display may be controlled.

LEDs are particularly well suited to be used as the light source for the miniature display system of the present invention for several reasons. First, they have a very low power requirement relative to the brightness of light generated. Second, they are very compact and can be easily incorporated into an extremely small system. Third, they are very fast switching and can be easily operated at controllable brightness. Fourth, they are available in a variety of colors. And finally they are very reliable and long lived.

Although the light source has been described as including three colors of LEDs with those three colors being red, green, and blue, it should be understood that the present invention is not limited to using three colors or to using these three specific colors, but instead would apply regardless of the number of colors used and regardless of the specific colors selected. Moreover, where the overall system is monochromatic, only one LED would be necessary. Also, although the light source has been described as one or more LEDs, it should be understood that any other type of light sources such as, but not limited to, laser diodes, fluorescent lamps, electroluminescent lamps, gas discharge arc lamps, incandescent bulbs, or cathodolluminescent sources of the field emitter or cold cathode type would fall within the scope of the present invention.

In an alternative embodiment of the present invention, light source 20 includes a miniature tungsten halogen light bulb. This light source may be used for either monochrome or color displays. The monochrome display simply directs the light from the bulb into the spatial light modulator as described above. However, for a color version, a conventional and readily providable FLC color filter (not shown), such as Displaytech's RGB FASTfilter color filter, is positioned within the illumination arrangement 16 such that it filters the light produced by the tungsten halogen bulb allowing light of a restricted range of wavelengths to pass into the spatial light modulator at any given time. The FLC color filter is designed to selectively filter the light such that, for instance, red, green, and blue light are provided at the appropriate times. As was briefly described above and as will be described in more detail hereinafter, this light of various colors is modulated by the spatial light modulator to produce a color image for the viewer.

Figure 3A:
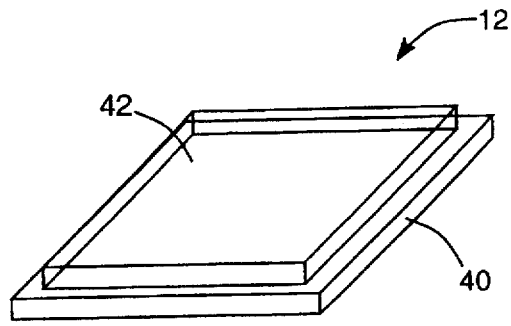
FIG. 3A is a diagrammatic view of the FLC/VLSI spatial light modulator forming part of the display system shown in FIG. 1.
Figure 3B:
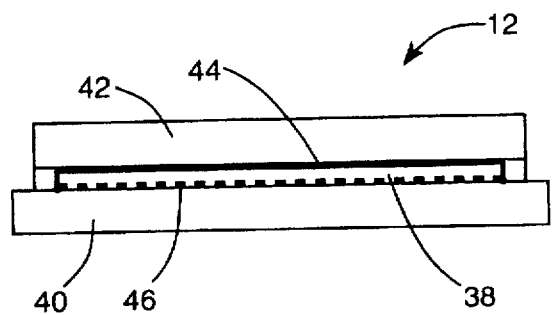
FIG. 3B is a diagrammatic cross sectional view of the FLCI/VLSI spatial light modulator shown in FIG. 3A.
Figure 3C:
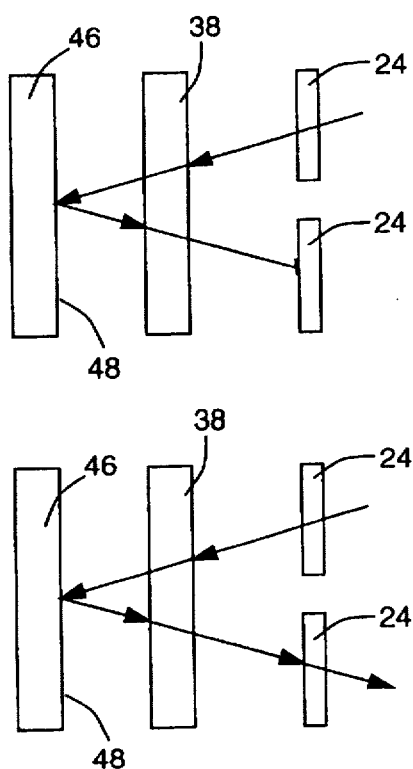
FIG. 3C is a diagrammatic cross sectional view of one of the pixels of the spatial light modulator shown in FIG. 3A, with the pixel being shown in both an ON state and an OFF state.

Referring now to FIGS. 3A–C, the FLC/VLSI spatial light modulator will be described in detail. In accordance with the present invention, FLC/VLSI spatial light modulator 12 includes a thin layer of ferroelectric liquid crystal (FLC) 38 confined between a silicon VLSI circuitry backplane 40 and a glass window 42 coated on its inner side with a transparent electrode layer of indium-tin oxide (ITO) 44. VLSI backplane 40 includes an array of aluminum pads, one of which is indicated at 46, positioned on the upper surface of VLSI backplane 40. Aluminum pads 46 each have a reflective top surface 48, best shown in FIG. 3C, which is designed to reflect light directed into the spatial light modulator back out of the spatial light modulator. Each of the aluminum pads 46 making up the array of aluminum pads also acts as an electrode controlled by data writing arrangement 14 as mentioned above. These aluminum pad electrodes 46 and ITO electrode 44 positioned on the opposite side of FLC layer 38 are used to form electric fields through FLC layer 38 and divide FLC layer 38 into individually controllable FLC pixels which correspond to the positions of aluminum pads 46.

In the presently preferred embodiment, FLC layer 38 is approximately one micron thick. This extremely thin FLC layer is significant because it is one of the factors which allows the pixels of the present invention to be made smaller than has been previously possible. As was described above, aluminum pad electrode 46 is spaced apart from overall ITO electrode 44 by FLC layer 38 which as just stated is approximately one micron thick. This narrow spacing allows the aluminum pad electrodes 46 to produce a well defined FLC pixel which does not spill over into adjacent pixels even when the light modulating area of the pixel is 10 microns or less in lateral extent. For example, in the case of square pixels (i.e. square pad electrodes 46) the pixels can be 10 microns or less on a side. Other liquid crystal materials, such as nematic liquid crystal for example, are not typically able to be used in layers this thin and therefore place larger restrictions on the size of the pixel that can be produced.

Figure 4:
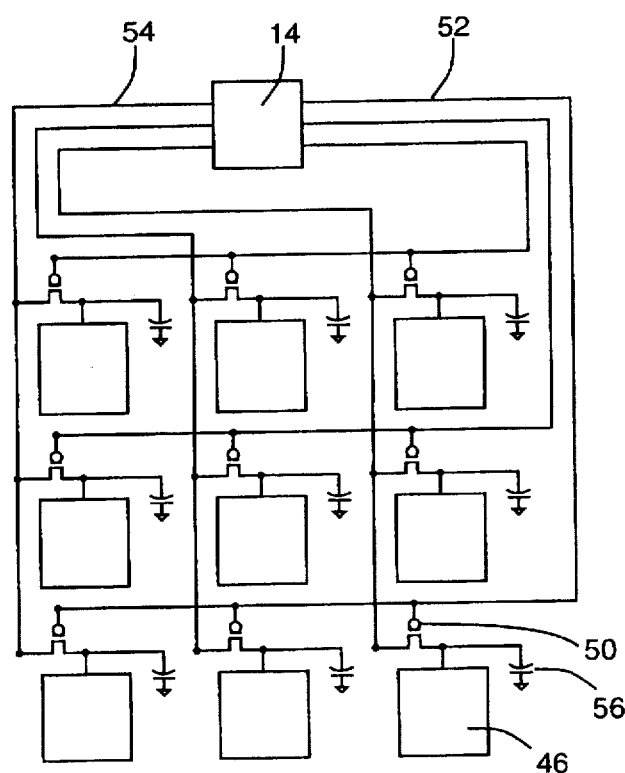
FIG. 4 is a schematic diagram of the circuitry for a three pixel by three pixel array VLSI backplane of the FLC/VLSI spatial light modulator shown in FIG. 3A.

Referring now to FIG. 4 which illustrates a circuit schematic of a three by three array of pixels, the circuitry of a preferred embodiment of the VLSI backplane 40 will be described in detail. As shown in FIG. 4 and in accordance with the present invention, each pixel comprises a subcircuit or cell including only one active component, specifically an FET pass transistor 50 individually addressable by a word line 52 and a bit line 54, a charge storage capacitor 56, and a corresponding reflective aluminum pad 46. These components form a one bit storage register within each pixel. Data writing arrangement 14 writes the pixels one row at a time using word and bit lines 52 and 54. Also, in accordance with the present invention and because each pixel subcircuit uses but one transistor, data writing arrangement 14, using a conventional row driver, by necessity writes each pixel row without the use of a data storage buffer of any kind within any of the pixel subcircuits since buffer circuitry would require additional active components within each of the pixel subcircuits. Thus, as soon as each row of pixels is written, its FLC layer begins to respond, so that if the rows of pixels are written one by one the pixel row' corresponding FLC responses will be unavoidably staggered in time. As will be described in more detail hereinafter, the novel data ordering schemes of the present invention fully compensate for this unavoidable staggering with respect to time of the FLC response. This is to be contrasted with a fully buffered approach in which each pixel subcircuit includes at least a second active component serving as a buffer. In the fully buffered case, all of the pixels in the display can be activated at once eliminating any delays; however, the pixel subcircuits are more complex.

Because the above described one-transistor subcircuit is so simple and compact and because of the thinness of the FLC layer described above, the spatial light modulator of the present invention allows for producing a pixel smaller than what has previously been possible. Therefore, this allows for producing an overall display smaller than what has been previously possible and a display with greater resolution. For example, using currently available 0.6 micron standard design rules for CMOS processing, a pixel pitch of about 5 microns may be achieved. This would result in a 1280 by 1024 pixel array having display dimensions of approximately 6 millimeters by 5 millimeters.

Referring back to FIG. 3A–C, the operation of a single pixel will be described in detail, although the other pixels are independently operated in a similar manner. In one of the presently preferred embodiments, overall ITO electrode 44 is held at a constant 2.5 volts. Data writing arrangement 14 writes image data to each pixel by establishing the ON/OFF state of that pixel. This is done by establishing the voltage of the charge-storage capacitor within each pixel described above at either 0 and 5 volts. These two voltages provide oppositely directed electric fields between aluminum pad electrode 46, which defines each pixel, and ITO electrode 44, and therefore across FLC layer 38. Reversing the electric field formed through FLC layer 38 causes the FLC layer to reorient its molecular structure, thereby changing the light transmitting characteristics of the FLC layer. When the pixel is in the OFF state, the molecular structure of FLC layer 38 is in a first orientation. Any light directed into the pixel is reflected back out by aluminum pad 46. Since the FLC layer is oriented in this first position it does not effect the polarization of the light and as described above, the light is directed away from the viewing lens by polarizer/analyzer 24 presenting a dark pixel to the viewer. When the pixel is in the ON state, the molecular structure of FLC layer 38 is reoriented such that the polarization of any light reflected out of that pixel is changed, or in this particular embodiment the light polarization is rotated 90°. Since the light now has an orthogonal polarization, it is allowed to pass through polarizer/analyzer 24 into the viewing lens presenting a bright pixel to the viewer. By controlling each of the pixels in this way the overall array of pixels may be used to form an image consisting of bright or dark pixels at any given time.

Although only one embodiment of the FLC/VLSI spatial light modulator has been described in detail, it should be understood that the components of the modulator may be embodied in many other specific forms without departing from the spirit or scope of the invention. For instance, the VLSI backplane 40 has been described as including an array of aluminum pads 46. Although aluminum pads 46 have been pictured as being square in shape, it should be understood that these pads may take on a wide variety of shapes such as but not limited to circular, octagonal, rectangular or any irregular shape depending on the requirements of the system. Also, it should be understood that the pads, although described as being aluminum, may be made from other electrically conductive and reflective metals. This, of course, assumes that the overall system is a reflective system as illustrated in FIG. 1. Alternatively, the present invention contemplates a transmissive system in which case the VLSI active matrix backplane is realized using silicon on sapphire technology which allows for light to be transmitted therethrough rather than reflected off of its components. In this case, the light source and its various optical components would be modified to accommodate the transmissive mode as opposed to the reflective mode.

Furthermore, the present invention is not limited to the specific voltages used in the above described preferred embodiment, so long as suitable voltages are selected to create the desired electric fields. Other embodiments of the present invention may incorporate additional circuit elements in the VLSI circuitry making up each pixel, or, between the data writing arrangement and the pixels. Other embodiments may also make use of an FLC layer having a thickness other than approximately one micron thick. All of these various embodiments would still fall within the spirit and scope of the present invention. Although the data writing arrangement has been described as writing the pixels row by row, this is not a requirement of the present invention. Instead, the pixels may be written in any desired sequence whether that is individual pixel by pixel, column by column, or some other sequence of specific groups of pixels.

Now that the configuration of the display system has been described in detail, the operation of the display system using data writing arrangement 14 will be described. As will be seen hereinafter, because of the fast switching characteristics of ferroelectric liquid crystal, FLC/VLSI spatial light modulator 12 has the ability to obtain a broad range of gray scale by using a variety of specific data ordering schemes designed in accordance with the present invention. Each of these data ordering schemes contemplates first establishing a particular frame time (which may be the same or vary from frame to frame) for the display system. In fact, in the case of printers, the overall operation of the system may take place during a single frame time. Frame rates of 45 frames per second or higher (i.e. video frame rates) are contemplated by the present invention which means that, for example, for a frame rate of 60 frames per second, each frame would be approximately 16.7 milliseconds long. As will be described in more detail hereinafter, each of these frames is then divided into a plurality of subframes for purposes of obtaining gray scale in the case of a monochromatic system or subframes for purposes of obtaining color and sub-subframes for purposes of obtaining color gray scale in the case of a color system.

In accordance with one data ordering scheme which will be described in more detail later and which will be hereinafter referred to as the time domain scheme, the gray scale of any given pixel is obtained by controlling the length of time that pixel is in the ON state during each frame. This is done by dividing the frames into subframes while maintaining the light directed into the modulator at a fixed brightness and by either turning ON or OFF the particular pixel during certain subframes of the frame such that the cumulative time in which the pixel is ON during the frame is proportional to the desired gray scale for that pixel. This is done for every pixel of the array for every frame.

Alternatively, in accordance with a second data ordering scheme which will later be described in more detail and which will hereinafter be referred to as the brightness domain scheme, the gray scale of any given pixel is obtained by dividing each frame into subframes and by turning ON or OFF the particular pixel during certain subframes of the frame while at the same time changing the brightness of light directed into the spatial light modulator for each of the different subframes. The cumulative time in which the pixel is ON, in combination with the brightness of the light during each subframe, is proportional to the desired gray scale for that pixel.

A third scheme hereinafter referred to as the hybrid scheme is a combination of the time domain scheme and brightness domain scheme. In all three of these schemes, because of the frame rate or speed at which the display presents frames to a viewer, the viewer's eye perceives the time integral of brightness of each pixel for each frame, thereby perceiving the desired gray scale image. Similarly, for a printer, a light sensitive print medium also integrates the optical energy for each pixel to yield a gray level which varies with the time integral of the brightness of each pixel.

Now, the various schemes for producing an active matrix display using data ordering techniques to obtain gray scale in accordance with the present invention and preferably at video rates will be described in detail. As was briefly described above, these schemes are generally categorized as the time domain scheme, the brightness domain scheme and the hybrid scheme. For each of these schemes, a desired frame rate is first established. This frame rate is typically set at a rate which produces smooth motion to the viewer's eye, for example, 60 frames per second which is a common frame rate used for video applications. Although a frame rate of 60 frames per second is used as an example, it should be understood that the present invention is not limited to this specific frame rate.

Figure 5:
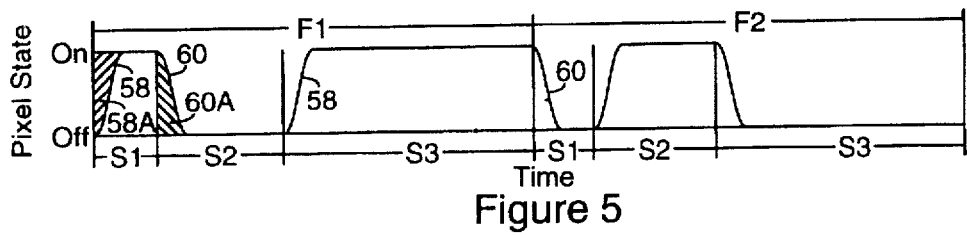
FIG. 5 is a graph illustrating the ON/OFF state of the pixel in the first row and first column of the array shown in FIG. 4 for a period of time equal to two frames with the frames being divided into subframes of different lengths of time for purposes of obtaining gray scale by controlling the ON/OFF state of the pixel during each subframe.

Referring to FIG. 5, a simple example of the time domain scheme for obtaining gray scale for the display will first be described for an individual pixel. FIG. 5 is a graph illustrating the ON/OFF state of an individual pixel relative to time for two consecutive frames. As described above for the time domain scheme, the light directed into the spatial light modulator is held at a constant brightness and the perceived gray scale of each pixel increases with the cumulative time during each complete frame in which that pixel is in the ON state.

As shown in FIG. 5 for the time domain scheme and in accordance with the present invention, frames F1 and F2 are divided into subframes having different lengths of time. In this example, frames F1 and F2 are divided into three subframes with a first subframe S1 being equal to 1/7 of the length of overall frame F1, a second subframe S2 twice as long as the first subframe S1 or 2/7 of overall frame F1, and a third subframe S3 twice as long as the second subframe S2 or 4/7 of overall frame F1. For each of these subframes, data writing arrangement 14 writes each pixel using a single binary bit to establish whether the pixel is in the ON or OFF state during each of the subframes. Only one bit is required to determine the state of the pixel. Thus, for example, writing arrangement 14 is able to provide digital data commands in the form of zeros and ones to control the ON/OFF state of each pixel during any given subframe. In this example, a zero (0) is used for turning a pixel OFF from an ON state or maintaining the pixel in an OFF state and a one (1) is used for turning a pixel ON from an OFF state or maintaining the pixel in an ON state.

By dividing the frame as described above, that is into three subframes of the different durations noted, eight levels of gray scale having equal changes in gray scale from level to level are achieved. These gray scale levels range from level 0, which corresponds to the pixel being in the OFF state throughout all three subframes of the frame, to level 7, which corresponds to the pixel being in the ON state throughout all three subframes of the frame. Any of the gray scale levels between level 0 and level 7 may be obtained by turning ON the pixel during the appropriate subframes.

As mentioned above, gray scale level 0 is obtained by turning OFF the pixel for all three subframes S1, S2, and S3 of the frame causing the pixel to be as dark as possible for that frame. This is a result of data commands from data writing arrangement 14 of zero (0) for each of the subframes S1, S2, and S3 which may be represented as a series of binary bits 0-0-0 with the first bit of the series corresponding to subframe S1, the second to subframe S2, and the third to subframe S3. Gray scale level 1 is obtained by turning ON the pixel during subframe S1 which is 1/7 of the overall length of the frame time, and turning it OFF for subframes S2 and S3. This causes the pixel to be ON for 1/7 of the frame and results in a pixel 1/7 as bright as would be the case if the pixel were left ON throughout the frame (i.e. gray scale level 7). Therefore, gray scale level 1 corresponds to data commands of one (1) for subframe S1, and zero (0) for subframe S2 and S3 which may be represented as a series of binary bits 1-0-0. Gray scale level 2 is obtained by turning ON the pixel during only subframe S2 which is 2/7 of the length of the frame. This causes the pixel to be ON for 2/7 of the overall frame resulting in a pixel 2/7 as bright as possible. Gray scale level 2 corresponds to data command 0-1-0. Using this three bit data command format, gray scale level 3 corresponds to data command 1-1-0, level 4 corresponds to command 0-0-1, level 5 to 1-0-1, level 6 to 0-1-1, and gray scale level 7 corresponds to data command 1-1-1. Accordingly, for each successive gray scale level, the pixel is ON for an additional 1/7 of the overall time of the frame and therefore results in a pixel brighter by 1/7 of the maximum brightness than the previous gray scale level. Thus, including gray scale level 0 which corresponds to the pixel being OFF for all three subframes, eight levels of gray scale are achieved with each level having equal changes in gray scale from level to level which is hereinafter referred to as linear gray scale.

Still referring to FIG. 5, one specific example of the time domain scheme will be described in detail. In this example, the pixel's state is switched for each of the subframes for illustrative purposes. The first frame corresponds to a gray scale level of 5 (1-0-1) and the second frame corresponds to a gray scale level of 2 (0-1-0). As shown in FIG. 5 at curve 58 which represents the actual switching time of the FLC material, when the pixel is switched to the ON state from its OFF state, the pixel takes a certain amount of time to respond. A typical amount of time for the FLC material used in the present invention to fully respond is approximately 100 microseconds. Also shown in FIG. 5 at curve 60, the pixel takes approximately the same amount of time to respond when it is switched to the OFF state from the ON state.

As the FLC material responds, it begins to change the polarization of the light directed into that pixel which in turn causes the amount of light directed to the viewer to change in proportion to the change in polarization. Since the FLC material responds in a similar way both when turned ON and OFF, the extra time the pixel is partially ON when it is turned OFF makes up for the time it is partially OFF when it is turned ON. In other words, the fall time of curve 60 in FIG. 5 which corresponds to the time the pixel takes to turn fully OFF makes up for the rise time of curve 58 which corresponds to the time the pixel takes to turn fully ON. Since the fall time of curve 60 exactly makes up for the rise time of curve 58, the actual time the pixel is ON is the same as if the pixel were able to respond instantaneously when switched, so long as one subframe follows another without a change in light source brightness or color. Under this condition, the rise time tail 58A (shaded area above curve 58 in FIG. 5) or the fall time tail 60A (shaded area below curve 60 in FIG. 5) during any given subframe is combined with either the fall time of the following subframe or the rise time of the proceeding subframe to fill one complete subframe regardless of response time. For this example, this means that even with the rise and fall time tails 58A and 60A which indicate that the pixel is in the process of turning partially ON or OFF, when combining the subframes, the cumulative amount of light which the FLC material of the pixel changes in polarity during any given subframe is exactly 1/7, 2/7, 3/7, or so on up to 7/7 of the polarized light directed into the pixel throughout the overall frame. This is the case for each of the consecutive gray scale levels which causes a corresponding increase of exactly 1/7 of the polarized light directed into the pixel to be changed in polarity. Therefore, the viewer's eye receives the eight levels of gray scale with equal incremental changes in gray scale from level to level thereby maintaining the linearity of the gray scale.

Also, as shown in FIG. 5, these tails 58A and 60A occur between frames as well as subframes. This again is necessary in order for maintaining the linearity of gray scale in the same manner just described with respect to subframes, but again so long as one frame follows another without changes in light source brightness or color. As long as the pixel is written at the proper time (i.e. at the beginning of the subframe in which the ON/OFF state is to be changed) and the light directed into the pixel is held constant in intensity without a change in color, the proper levels of gray scale will be maintained both from subframe to subframe and from frame to frame irrespective of the presence of tails 58A and 60A. However, as will be described in more detail hereinafter, if the light is varied in any way (either in terms of brightness or color) from subframe to subframe or frame to frame, the response time of the FLC material indicated by curves 58 and 60 of FIG. 5 resulting in tails 58A and 60A would pose a problem for maintaining the proper incremental change of gray scale from subframe to subframe and frame to frame.

Although the above example describes dividing the frame into three subframes in order to obtain eight levels of gray scale, it should be understood that the present invention would apply regardless of the number of subframes that the frame is divided into, so long as the shortest subframe allows the FLC material to fully respond during that subframe. By adding subframes, each of which is twice as long as the proceeding subframe, the number of gray scale levels is increased by a factor of two for each subframe added. Therefore, four subframes would provide 16 gray scale levels (0–15), five subframes would provide 32 levels (0–31), and so on up to as many or more than eight subframes which would provide 256 levels of gray scale (0–255). However, using a frame rate of 60 frames per second and dividing the frames into eight subframes of different lengths which successively double in duration as described above, the shortest subframe would be approximately 65 microseconds long. This would not be a long enough amount of time to allow the FLC material to fully respond if the FLC material required 100 microseconds to fully respond as mentioned above. However, it should be understood that FLC materials having a faster switching speed may be used while remaining within the scope of the present invention thereby solving this time problem. Alternatively, this problem may be solved by using the brightness domain scheme for at least some of the subframes as will be described in detail hereinafter. On the other hand, operating at 128 gray scale levels (seven subframes), the shortest subframe would be about 130 microseconds long, providing plenty of time for the 100 microsecond response time of the FLC material.

Figure 6:
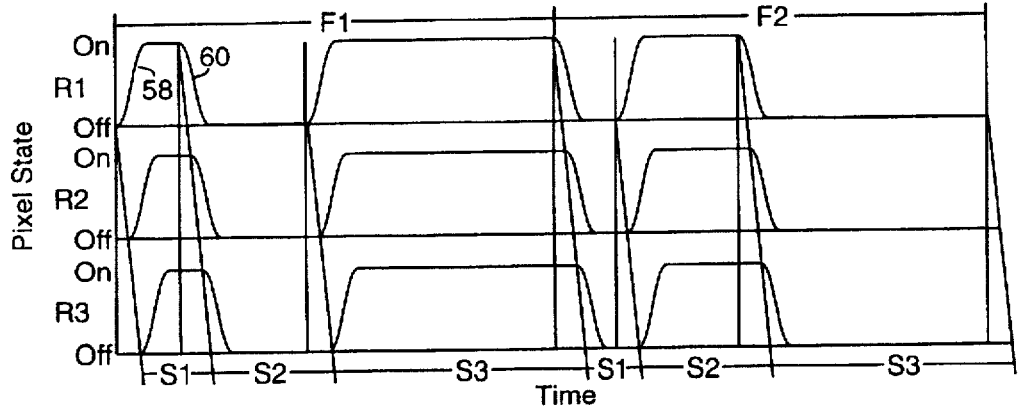
FIG. 6 is a graph illustrating the ON/OFF state of all of the pixel rows in the array shown in FIG. 4 for a period of time equal to two frames with the frames being divided into subframes of different lengths of time while maintaining a constant light source brightness for purposes of obtaining gray scale by controlling the ON/OFF state of the pixels during each subframe.

Referring now to FIG. 6, the example given for a single pixel operating with the time domain scheme to obtain gray scale will be expanded to illustrate the operation of the three pixel by three pixel array shown in FIG. 4. The graph in FIG. 6 illustrates the ON/OFF state of each of the three rows of pixels relative to time with the rows of pixels being arranged in order, row by row, from top to bottom with pixel R1 being the top row of pixels and row R3 being the bottom row of pixels. In this example, for illustrative purposes, each of the individual pixels within each row simultaneously receives the same data and therefore has a graph identical to the graph described above in FIG. 5 with each of frames F1 and F2 being divided into subframes S1, S2, and S3. However, as especially illustrated in FIG. 6, the beginning of each of the pixel graphs corresponding to each of the rows of pixels R1 through R3 are shifted timewise a predetermined amount successively from pixel row R1 to pixel row R2 and from pixel row R2 to pixel row R3. This is because, as described above, the data writing arrangement sequentially writes each pixel row without the use of a buffer in any of the pixel subcircuits, and therefore takes a certain amount of time to write each pixel row.

In the preferred embodiment, for the overall display described herein to function properly, it is important that all of the pixel rows in the array are written within the time of any single subframe. This is necessary in order to allow the first pixel row written in any given subframe to be written again at the beginning of the next consecutive subframe. As the number of pixel rows making up the display is increased, the overall time required to write all of the pixel rows making up the array also increases. However, as mentioned above, even for the shortest subframe S1, all of the pixel rows of the array must be written during the time available for that subframe S1 so that the first pixel row may be again written for the next subframe S2 at the proper time. When the number of gray scale levels is increased as described above, this amount of time is cut in half for each subframe added. Also, as described above, the shortest subframe must be long enough for the FLC material to fully respond to any change in ON/OFF state. Therefore, the shortest subframe S1 must be sufficiently long (i) to allow the data writing arrangement to write all of the pixel rows in the array and (ii) to allow each pixel (actually the FLC) to fully respond (either entirely turn ON or OFF). Thus, in the case where it takes 100 microseconds for a pixel to respond, the shortest subframe S1 can be no shorter than that even if the pixel rows could be written at a faster rate.

Figure 7:
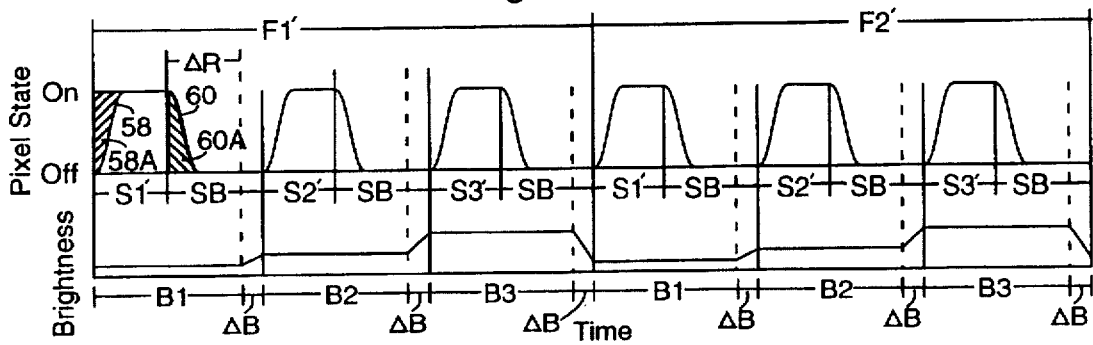
FIG. 7 is a graph illustrating the ON/OFF state of the pixel in the first row and first column of the array shown in FIG. 4 for a period of time equal to two frames with the frames being divided into subframes of equal lengths of time for purposes of obtaining gray scale by controlling the ON/OFF state of the pixel during each subframe and by changing the brightness of light illuminating the array for each of the subframes, each of the subframes being followed by a blackout subframe to allow for changing the brightness of the light without adversely effecting the desired gray scale.

Referring now to FIG. 7, the brightness domain scheme for obtaining gray scale will be described in detail. As mentioned above for the brightness domain scheme, the brightness of the light directed into the spatial light modulator is changed for each subframe and the gray scale of each pixel is proportional to the cumulative time during a complete frame in which that pixel is in the ON state in combination with the brightness of the light during each of those subframes.

FIG. 7 illustrates the ON/OFF state of an individual pixel relative to time for two consecutive frames using a first particular brightness domain scheme for writing the pixels. In his scheme, each of the frames F1' and F2' are divided into subframes S1', S2', and S3' of equal length. However as will be described in more detail hereinafter, because (i) it takes time or the brightness of the light to be changed after each subframe, (ii) it takes time for the FLC material to respond to a change in state and (iii) it takes time to write each of the pixels in the array; a blackout subframe SB is used after each subframe S1', S2', and S3' in accordance with the present invention to maintain the proper levels of gray scale from subframe to subframe. In this case, rise time tails and fall time tails cannot be combined to compensate for one another as in the time domain case since source brightness changes from subframe to subframe. As shown in FIG. 7, blackout subframe SB provides enough time ΔR for the pixel to be switched to the OFF state and to fully respond along with providing an additional amount of time ΔB for changing the brightness of the light. In this embodiment, all of the pixels must be switched OFF and must have fully responded prior to changing the brightness of the light.

The blackout subframes SB are important in order to maintain the proper gray scale levels for this particular brightness domain scheme of writing the pixels. This is because, as described above for the time domain scheme, the pixel has a certain response time for switching its ON/OFF state represented by curves 58 and 60 in FIG. 7. As was described in detail for the time domain approach, the fall time tail 60A (curve 60) makes up for the rise time tail 58A (curve 58) such that the cumulative amount of time the pixel is ON is the proper amount of time to maintain an even change of gray scale from level to level. However, the light directed into the pixel must be held constant (and of the same color) throughout both the rise time (curve 58) and the fall time (curve 60) for each subframe or the total amount of light of which the polarization is changed by the FLC material will not be the exact amount necessary to maintain an incrementally even changing gray scale from gray scale level to gray scale level. Therefore, blackout subframes SB are provided after each subframe S1', S2', and S3' in order to provide enough time, ΔR, for the pixel to fully turn OFF prior to changing the brightness of light directed into the pixel. Also, since a certain amount of time may be required in order to change the brightness of light directed into the pixel, an additional amount of time ΔB may be provided within subframe SB which provides enough time for the brightness of light directed into the pixel to be changed. As mentioned above, in this embodiment, all of the pixels must be switched OFF and must have fully responded prior to changing the brightness of the light.

In the example illustrated in FIG. 7, each of the frames F1' and F2' are divided into three subframes S1', S2', and S3' each being followed by a blackout subframe SB as described above and each being of an equal length of time. However, contrary to the time domain scheme, for the brightness domain scheme of obtaining gray scale, the brightness of light directed into the pixel is changed for each subframe S1', S2', and S3'. During subframe S3', the maximum brightness of light available, represented by brightness B3 in FIG. 7, is directed into the pixel. During subframe S2', the brightness of light directed into the pixel is reduced to half the brightness of light which was directed into the pixel during subframe S3'. This brightness is represented by brightness B2 in FIG. 7. And finally, during subframe S1', the brightness of light directed into the pixel, represented by brightness B1, is reduced to half the brightness of B2. Therefore, the brightness of the light directed into the pixel is increase by a factor of two for each consecutive subframe S1', S2', and S3' within the frames F1' and F2'.

Dividing the frame into three subframes as described above provides eight levels of gray scale (level 0 through level 7) in a way similar to what was described above for the time domain scheme except that the brightness of the light is increased by a factor of two for each of the subframes rather than increasing the length of time for each successive subframe. As was described in detail for the time domain scheme, data writing arrangement 14 controls each pixel using a binary bit (either a zero for OFF or a one for ON) to establish the ON/OFF state of each pixel for each subframe. However, when using the data command format described for the time domain scheme, the brightness domain scheme requires three additional bits corresponding to the blackout subframes and therefore requires a series of six bits to fully control each frame for the example shown in FIG. 7.

Specifically, as shown in FIG. 7, gray scale level 7 is obtained by turning ON the pixel for all three subframes S1', S2', and S3' of the frame causing the pixel to be as bright as possible for that frame. This is a result of data commands from data writing arrangement 14 of one (1) for each of the subframes S1', S2', and S3' and zeros (0) for each of the blackout subframes SB following subframes S1', S2', and S3' which may be represented by a series of six binary bits 1-0-1-0-1-0 with the first bit corresponding to subframe S1', the second bit corresponding to the blackout subframe SB following S1' and so on though the final blackout subframe SB at the end of the frame. Using this six bit data command format, gray scale level corresponds to command 0-0-1-0-1-0, level 5 to 1-0-0-0-1-0, level 4 to 0-0-0-0-1-0, level 3 to 1-0-1-0-0-0, level 2 to 0-0-1-0-0-0, level 1 to 1-0-0-0-0-0, and finally gray scale level 0 corresponds to data command 0-0-0-0-0-0. Since brightness B2 of subframe S2' is twice as bright as brightness B1 of subframe S1' and subframe S1' and S2' are of equal length of time, the total amount of light available in subframe S2' is twice that available in subframe S1'.

Also, since brightness B3 of subframe S3' is four times as bright as B1 and subframe S1' and S3' are of equal length of time, the total amount of available light in subframe S3' is four times that available in S1'. Therefore, the total amount of light available in subframe S1' is 1/7, S2' is 2/7 and S3'is 4/7 of the total amount of the overall light available in subframes S1', S2', and S3'. By turning ON and OFF the pixel as described immediately above, eight gray scale levels (0–7) are obtained with each successive level having a brightness 1/7 of the maximum brightness brighter than the previous level.

As mentioned above for the time domain scheme, although the above example describes dividing the frame into three subframes each followed by a blackout subframe to obtain eight levels of gray scale, it should be understood that the present invention would apply regardless of the number of subframes that the frame is divided into, so long as the length of the subframes, timewise, allows the FLC material to fully respond during the subframes. By adding subframes with a corresponding blackout subframe, each of which has light of a brightness twice as bright as the proceeding subframe, the number of gray scale levels is increased by a factor of two for each subframe added. Therefore, four subframes with their corresponding blackout subframes would provide 16 gray scale levels (0–15), five subframes would provide 32 levels (0–31), and so on up to as many or more than eight subframes with their corresponding blackout subframes which would provide 256 levels of gray scale (0–255).

Figure 8:
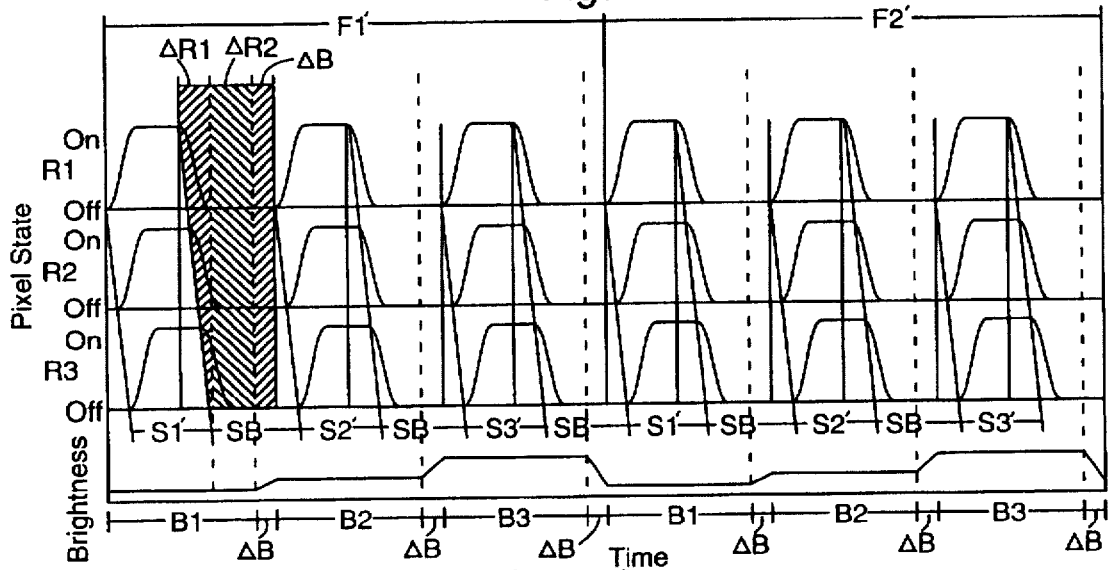
FIG. 8 is a graph illustrating the ON/OFF state of all of the pixel rows in the array shown in FIG. 4 for a period of time equal to one frame with the frame being divided into subframes of equal lengths of time for purposes of obtaining gray scale by controlling the ON/OFF state of the pixels during each subframe and by varying the brightness of light illuminating the array during each of the subframes, each of the subframes being followed by a blackout subframe to allow for changing the brightness of the light without adversely effecting the desired gray scale.

Referring now to FIG. 8, the example given for a single pixel operating using the above described brightness domain scheme to obtain gray scale will be expanded to illustrate the operation of the three pixel by three pixel array shown in FIG. 4. The graph in FIG. 8 illustrates the ON/OFF state of each of the three rows of pixels relative to time with the rows of pixels being arranged in order, row by row, from top to bottom with pixel row R1 being the top row of pixels and pixel row R3 being the bottom pixel row. In this example, for illustrative purposes, each of the individual pixels within each pixel row simultaneously receives the same data and therefore has a graph identical to the graph described above in FIG. 7 with frame F1' being divided into subframes S1', S2', and S3' each with their corresponding blackout subframe SB. However, the beginning of each of the pixel graphs corresponding to pixel rows R1 through R3 are shifted timewise a predetermined amount successively from pixel row R1 to pixel row R2 and from pixel row R2 to pixel row R3. This is because, as described above, the data writing arrangement sequentially writes each pixel row without the use of any buffer circuitry within the individual pixel subcircuits, and therefore takes a certain amount of time to write each pixel row.

As described in detail above for the time domain scheme, for the overall display described herein to function properly, all of the pixels in the array must be written within time of any single subframe. This is necessary in order to allow the first pixel row written in any given subframe to be written again at the beginning of the next consecutive subframe. However, for the brightness domain scheme, as shown in FIG. 8, each subframe is followed by a blackout subframe SB made up of three portions; a first portion ΔRI which is long enough for all pixel rows in the array to be switched OFF by data writing arrangement 14 (writing time for all pixel rows), a second portion ΔR2 which is long enough for the pixels in the array to fully turn OFF (individual pixel FLC response time), and a third portion AB which is long enough for the brightness of light directed into each pixel to be fully changed to the appropriate brightness for the next subframe if the light is not able to switch brightness instantaneously. Therefore, for example, using the same FLC response time (ΔR2) of 100 microseconds used in previous examples and also using 100 microseconds as the time (ΔR1) needed for writing all of the pixel rows in the array for each subframe, the approximate minimum total length of each subframe and its corresponding black out subframe SB would be; 100 microseconds (the FLC response time) for the subframe itself, plus blackout subframe time SB consisting of 100 microseconds (the time allowed for writing all the pixel rows) for the ΔR1 portion of blackout subframe SB, plus 100 microseconds (the FLC response time) for the ΔR2 portion of blackout subframe SB, plus the time ΔB it takes to switch the brightness of the light (if necessary). Thus the minimum length of a brightness domain subframe and its corresponding blackout subframe, for this example, would be approximately 300 microseconds plus the ΔB switching time (if necessary).

Because each of the subframes combined with their corresponding blackout subframes are of an equal length of time, the brightness domain scheme has the advantage of not being restricted by the length, timewise, of the shortest subframe as was described above for the time domain scheme. For example, using the same frame rate of 60 frames per second (giving a frame length of 16,666 microseconds), the same response time for the FLC material of 100 microseconds, and the same writing time of 100 microseconds as was used in the examples given for the time domain scheme, the minimum length of each subframe including its corresponding blackout subframe for the brightness domain scheme would be approximately 300 microseconds plus a time ΔB as described immediately above. This would allow enough time within each frame for approximately fifty five subframes, as compared to a limit of seven subframes using the time domain approach as mentioned above in the time domain example. Since the number of gray scale levels is increased by a factor of two for each subframe added, fifty five subframes would provide far more gray scale levels than would be practical. Therefore, since fifty five subframes are not necessary, each of the subframes which are employed may be substantially longer than the minimum length described above. This improves the effective use of the light source and the overall brightness of the display by allowing the pixels to be in their fully ON state for a longer period of time during any given subframe. For example, to provide 256 gray scale levels 8 subframes are required. Dividing the frames into subframes of equal length, each subframe and its associated blackout subframe would be approximately 2000 microseconds. Subtracting the 200 microseconds for the blackout subframe plus the time ΔB required to switch the brightness of the light (if necessary), allows the subframe itself to be approximately 1800 microseconds. Since the FLC material takes 100 microseconds to fully respond, in this example, a pixel in the ON state for a particular subframe would be fully ON for approximately 1700 microseconds.

Although the embodiment described utilizes a blackout subframe in a spatial light modulator using a FLC layer as the modulating material, it should be understood that the use of a blackout subframe in a brightness domain scheme is not limited to being used with this modulating material. In fact this use of a blackout subframe within a brightness domain scheme would equally apply regardless of the modulating medium used including nematic liquid crystal or other modulating materials.

In the brightness domain scheme, for each additional subframe and its corresponding blackout subframe used in the brightness scheme, the brightness of light directed into the pixel must be increased by a factor of two. Therefore, as the number of gray scale levels is increased, the effective usage of any given light source is reduced since the light can only be used at its brightest possible level for one subframe and for the other subframes it must be dimmed by a factor of two for each additional subframe, thereby compromising its efficiency significantly. Alternatively, in the time domain approach, the light source may be used at its maximum brightness throughout the operation resulting in very efficient use of the light source, however, the shortest subframe is restricted to a minimum duration which restricts the number of achievable gray scale levels. This problem of using the light source inefficiently in the brightness domain approach and the problem of being limited by the shortest subframe in the time domain approach can be solved in accordance with the present invention by using a combination of the time domain scheme and the brightness domain scheme as will be described in detail hereinafter.

Figure 9:
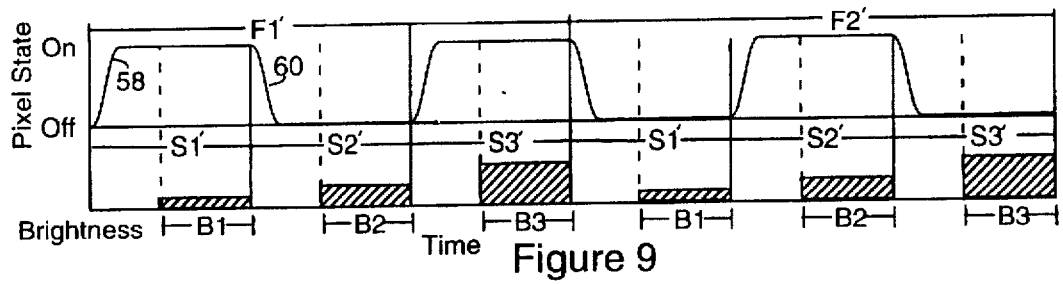
FIG. 9 is a graph illustrating the ON/OFF state of the pixel in the first row and first column of the array shown in FIG. 4 for a period of time equal to two frames with the frames being divided into subframes of equal lengths of time for purposes of obtaining gray scale by controlling the ON/OFF state of the pixel during each subframe and by changing the brightness of light illuminating the array for each of the subframes, the light illuminating the display being turned OFF during certain times to allow the pixels to change their ON/OFF state without adversely effecting the desired gray scale before turning ON the light at a different brightness.

Alternatively, FIG. 9 illustrates the ON/OFF state of an individual pixel relative to time for two consecutive frames using a second particular brightness domain scheme for writing the pixels. In this scheme, each of the frames F1' and F2' are divided into subframes S1', S2', and S3' of equal length as described above for the first brightness domain scheme. However, as will be described in more detail hereinafter, in this second brightness domain scheme, the light source is turned OFF during certain portions of each subframe to allow all of the pixel rows to be written and fully respond prior to turning the light ON. This eliminates the need for the above described blackout subframes which instead uses the pixels themselves to create the blackout. Specifically, in the previous described embodiment, the blackout was created by turning all of the pixels OFF. In this alternative embodiment, the light source is turned OFF to create a blackout. Also, in this case, since the light is OFF while the pixel rows are being written and fully responding, the rise time tails and fall time tails occur during the blackout time when the light is OFF and therefore these tails do not create any problem for maintaining the linearity of the gray scale.

In the example illustrated in FIG. 9, each of the frames F1' and F2' are divided into three subframes S1', S2', and S3' each being of an equal length of time. As was described above for the first brightness domain scheme, the brightness of light directed into the pixel is changed for each subframe S1', S2', and S3'. During a specific portion B3 of subframe S3' after the pixel has been written and fully responded, the maximum brightness of light available, represented by brightness B3 in FIG. 9, is directed into the pixel. During a specific portion B2 of subframe S2' after the pixel has been written and fully responded, light having a brightness half the brightness of light which was directed into the pixel during subframe S3' is directed into the pixel. This brightness is represented by brightness B2 in FIG. 9 and this brightness is directed into the pixel for the same amount of time as B3. And finally, during a specific portion B1 of subframe S1' after the pixel has been written and fully responded, light having a brightness half the brightness of light which was directed into the pixel during subframe S2' is directed into the pixel. This brightness is represented by brightness B1 in FIG. 9 and is directed into the pixel for the same amount of time as B3 and B2. Therefore, the brightness of the light directed into the pixel is increase by a factor of two for each consecutive subframe S1', S2', and S3' within the frames F1' and F2'. In addition, the light is turned off entirely in each subframe before the pixel is written for the succeeding subframe thereby eliminating all possible dependence of the gray scale level on the response times 58 and 60 of the FLC.

Dividing the frame into three subframes as described above provides eight levels of gray scale (level 0 through level 7) in a way similar to what was described above for the first brightness domain scheme except that the blackout subframes are not required. As was described in detail for the time domain scheme, data writing arrangement 14 controls each pixel using a binary bit (either a zero for OFF or a one for ON) to establish the ON/OFF state of each pixel for each subframe. Specifically, as shown in FIG. 9 which illustrates gray scale level 5, gray scale level 5 is obtained by turning ON the pixel for subframes S1' and S3' and turning the pixel OFF for subframe S2' of the frame. This is a result of data commands from data writing arrangement 14 of one (1) for each of the subframes S1' and S3' and a zero (0) for subframe S2' which may be represented by a series of three binary bits 1-0-1 with the first bit corresponding to subframe S1', the second bit corresponding to the subframe S2', and the third bit corresponding to the subframe S3'.

Using this three bit data command format, gray scale level 7 corresponds to command 1-1-1, level 6 to 0-1-1, level 4 to 0-0-1, level 3 to 1-1-0, level 2 to 0-1-0, level 1 to 1-0-0, and finally gray scale level 0 corresponds to data command 0-0-0. Since brightness B2 during subframe S2' is twice as bright as brightness B1 during subframe S1' and brightness B2 and B1 are ON for an equal length of time, the total amount of light available in subframe S2' is twice that available in subframe S1'. Also, since brightness B3 during subframe S3' is four times as bright as B1 and brightness B3 and B2 are ON for an equal length of time, the total amount of available light in subframe S3' is four times that available in S1'. Therefore, the total amount of light available in subframe S1' is 1/7, S2' is 2/7 and S3' is 4/7 of the total amount of the overall light available in subframes S1', S2', and S3'. By turning ON and OFF the pixel and turning ON and OFF the light as described immediately above, eight gray scale levels (0–7) are obtained with each successive level having a brightness 1/7 of the maximum brightness brighter than the previous level.

As mentioned above for the time domain scheme, although the above example describes dividing the frame into three subframes to obtain eight levels of gray scale, it should be understood that the present invention would apply regardless of the number of subframes that the frame is divided into, so long as the length of the subframes, timewise, allows (i) all of the rows of pixels to be written, (ii) the FLC material to fully respond, and after all of the rows have been written and fully responded allows (iii) an equal amount of time during each subframe for the light to be directed into the pixels at the proper brightness. By adding subframes, each of which has light of a brightness twice as bright as the proceeding subframe, the number of gray scale levels is increased by a factor of two for each subframe added. Therefore, four subframes would provide 16 gray scale levels (0–15), five subframes would provide 32 levels (0–31), and so on up to as many or more than eight subframes which would provide 256 levels of gray scale (0–255).

Figure 10:
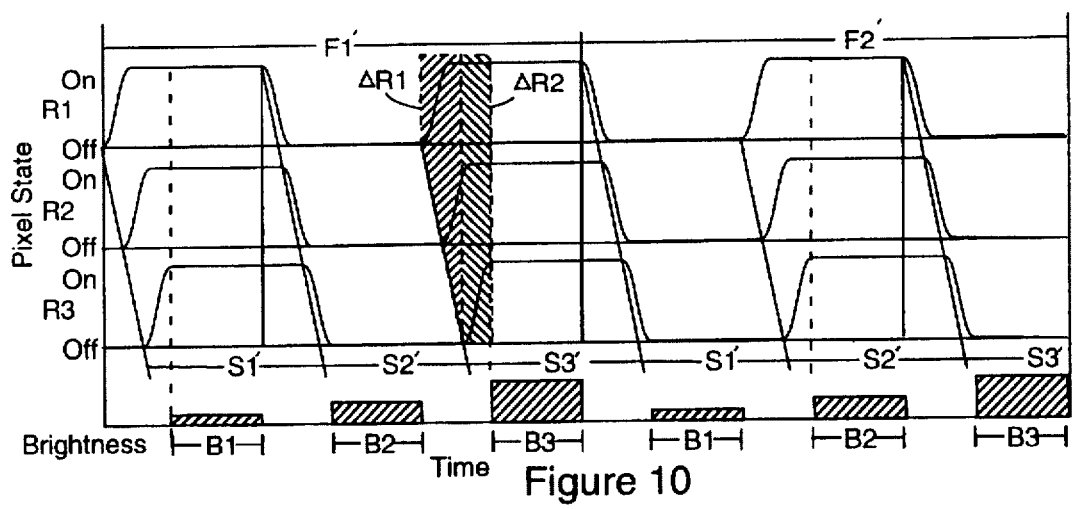
FIG. 10 is a graph illustrating the ON/OFF state of all of the pixel rows in the array shown in FIG. 4 for a period of time equal to one frame with the frame being divided into subframes of equal lengths of time for purposes of obtaining gray scale by controlling the ON/OFF state of the pixels during each subframe and by varying the brightness of light illuminating the array during each of the subframes, the light illuminating the display being turned OFF during certain times to allow the pixels to change their ON/OFF state without adversely effecting the desired gray scale before turning ON the light at a different brightness.

Referring now to FIG. 10, the example given for a single pixel operating using the above described second brightness domain scheme to obtain gray scale will be expanded to illustrate the operation of the three pixel by three pixel array shown in FIG. 4. The graph in FIG. 10 illustrates the ON/OFF state of each of the three rows of pixels relative to time with the rows of pixels being arranged in order, row by row, from top to bottom with pixel row R1 being the top row of pixels and pixel row R3 being the bottom pixel row. In this example, for illustrative purposes, each of the individual pixels within each pixel row simultaneously receives the same data and therefore has a graph identical to the graph described above in FIG. 9 with frame F1' being divided into subframes S1', S2', and S3'. However, the beginning of each of the pixel graphs corresponding to pixel rows R1 through R3 are shifted timewise a predetermined amount successively from pixel row R1 to pixel row R2 and from pixel row R2 to pixel row R3. This is because, as described above, the data writing arrangement sequentially writes each pixel row without the use of any buffer circuitry within the individual pixel subcircuits, and therefore takes a certain amount of time to write each pixel row.

As described in detail above for the time domain scheme, for the overall display described herein to function properly, all of the pixels in the array must be written within the time of any single subframe. Also, for this embodiment of the brightness domain scheme, each subframe must be long enough, after all of the pixels have been written and fully responded, to direct the proper brightness of light into the pixels for the proper amount of time. As shown in FIG. 10, each of the subframes S1', S2', and S3' are made up of three portions, a first portion ΔR1 which is the amount of time it takes to write all of the rows of pixels, a second portion ΔR2 which is the amount of time it takes for the pixels to fully respond, and a third portion B1, B2, or B3 which is the proper length of time in which the proper brightness of light is directed into the pixel array as described above. As mentioned above, because in this second brightness domain scheme the light source is turned OFF during certain portions, specifically times ΔR1 and ΔR2, of each subframe to allow all of the pixel rows to be written (ΔR1) and fully respond (ΔR2) prior to turning the light ON, the need for blackout subframes described for the first brightness domain scheme is eliminated. Also, in this case, since the light is OFF while the pixel rows are being written and fully responding, the rise time tails and fall time tails do not create any problem for maintaining the fidelity of the gray scale as was the case for the time domain scheme and the first brightness domain scheme described above. For this version of the brightness domain scheme, it is assumed that the time needed to turn the light source on and off is negligible. If this is not the case for some light source, those skilled in the art will readily recognize that the times B1, B2, and B3 may be made unequal so as to preserve the required geometric progression of the time integral of brightness which must hold for the subframes.

As mentioned above for the other brightness domain scheme, because each of the subframes are of an equal length of time, the brightness domain scheme has the advantage of not being restricted by the length, timewise, of the shortest subframe as was described above for the time domain scheme. This allows for more subframes within a frame, therefore allowing for a greater number of gray scale levels. However, as also mentioned above, in the brightness domain scheme, for each additional subframe used in the brightness scheme, the brightness of light directed into the pixel must be increased by a factor of two. Therefore, as the number of gray scale levels is increased, the effective usage of any given light source is reduced since the light can only be used at its brightest possible level for one subframe and for the other subframes it must be dimmed by a factor of two for each additional subframe, thereby compromising its efficiency significantly. Alternatively, in the time domain approach, the light source may be used at its maximum brightness throughout the operation resulting in very efficient use of the light source. This problem of using the light source inefficiently in the brightness domain approach and the problem of being limited by the shortest subframe in the time domain approach can be solved in accordance with the present invention by using a combination of the time domain scheme and the brightness domain scheme as will be described in detail hereinafter.

Figure 11:
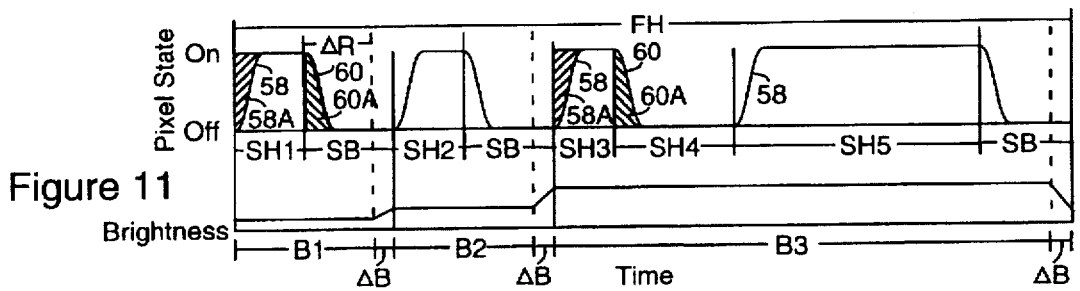
FIG. 11 is a graph illustrating the ON/OFF state of the pixel in the first row and first column of the array shown in FIG. 4 for a period of time equal to one frame with the frame being divided according to a combination of the schemes illustrated in FIGS. 5 and 7.
Figure 12:
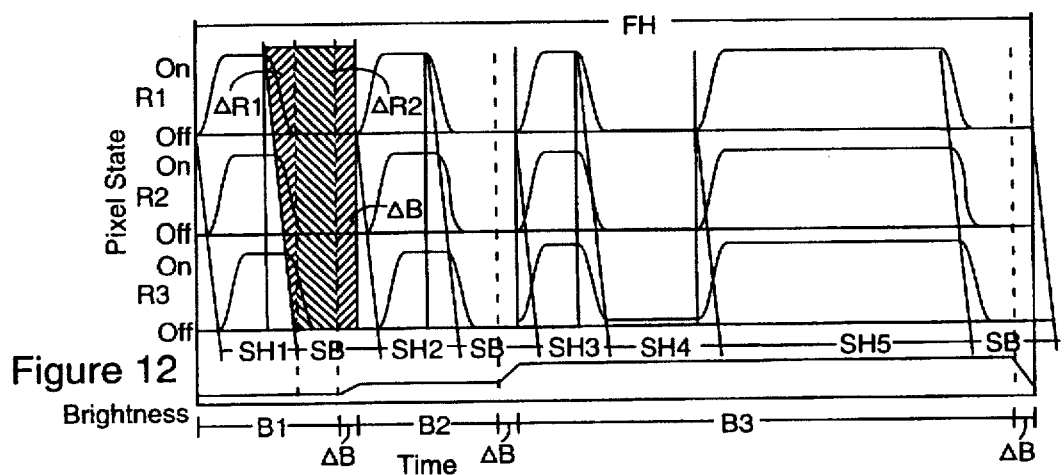
FIG. 12 is a graph illustrating the ON/OFF state of all of the pixel rows in the array shown in FIG. 4 for a period of time equal to one frame with the frame being divided according to a combination of the schemes illustrated in FIGS. 6 and 8.

Referring now to FIGS. 11 and 12, the hybrid scheme for obtaining gray scale will be described. As was explained above for the time domain scheme, the number of gray scale levels is limited by the time required for the FLC material to fully respond to a change in state.

In the hybrid scheme, the time domain scheme is typically used for as many subframes as possible until the size of the subframes, timewise, approach the length of time which is required for the FLC material to respond, or, the length of time required to write all of the pixel rows, which ever is longer. In the hybrid scheme, any desired remaining subframes, the number of which will depend on the levels of gray scale desired, will have the same length of time as the smallest time domain subframe. However, during these latter subframes, the brightness of the light directed into the modulator will be successively reduced by a factor of two as was described above for the brightness domain scheme. Also, if the first described brightness domain scheme is used, each time the brightness of the light is changed, a blackout subframe is positioned between the two subframes between which the brightness of light is to be changed. This combination of the time domain and brightness domain schemes preserves the linearity of the gray scale levels without requiring subframes shorter than (i) the time required for the FLC material to change state or (ii) the time required to write all of the pixel rows in the array. It also utilizes the light source more efficiently by using the time domain scheme as much as possible which keeps the light source at its maximum output as much as possible.

Referring to FIG. 11, one specific example of an individual pixel controlled by data writing arrangement 14 using the hybrid scheme to obtain gray scale will be described in detail. In this example, thirty two levels (0–31) of gray scale are provided by dividing each frame FH into five subframes SH1 through SH5. Subframes SH1 and SH2 are controlled using the first described brightness domain scheme and therefore are of equal length and have differing brightness of light B1 and B2, respectively, associated with them. Subframes SH3, SH4, and SH5 are controlled using the time domain scheme and therefore have a constant brightness B3 associated with them which is, in accordance with the hybrid scheme, twice as bright as B2 and four times as bright as B1. As described above for the time domain scheme, subframe SH5 is twice as long as SH4, which is twice as long as SH3, which in accordance with the hybrid scheme is the same length as SH1 and SH2. Each time the brightness of the light is changed, that is after SH1, SH2, and S15, an additional blackout subframe SB is inserted in accordance with the present invention and as was described in detail above for the first described brightness domain scheme.

With the above described arrangement of subframes, data writing arrangement 14 is able to write the pixel using a binary bit (i.e. a zero or a one) for each of the five subframes and three blackout subframes making up overall frame FH. Since subframe SH1 is ¼ as long as SH5 and B1 is ¼ as bright as B3, the total light available during subframe SH1 is 1/16 of that available during SH5 and 1/31 of the total light available throughout frame FH. Since SH2 is ¼ as long as SH5 and B2 is ½ as bright as B3, the total light available during SH2 is 2/16 of that available during SH5 and 2/31 of the total light available throughout frame FH. Since SH3 is ¼ as long as SH5 and has the same brightness, the total amount of light available during SH3 is 4/16 of that available during SH5 and 4/31 of the total light available throughout frame FH. And finally, since SH4 is half as long as SH5, the light available during SH4 is 8/16 of that available during SH5 and 8/31 of the total light available throughout frame FH. Therefore, by controlling the ON/OFF state of the pixel during each of the subframes of frame FH, thirty two gray scale levels (0–31) having equal changes in gray scale from level to level are provided. For example, as shown in FIG. 11, gray scale level 23 is obtained by having data writing arrangement 14 provide a series of eight binary bits 1-0-1-0-1-0-1-0 with the first bit corresponding to subframe SH1, the second bit to blackout subframe SB following SH1, and so on until the eighth bit which corresponds to blackout subframe SB following subframe SH5. Each of the other gray scale levels is obtained using a similar series of eight bits with the pixel being turned ON during the appropriate subframes.

In FIG. 12, the example given for a single pixel operating using the hybrid scheme to obtain gray scale is expanded to illustrate the operation of the three pixel by three pixel array shown in FIG. 4. The graph in FIG. 12 illustrates the ON/OFF state of each of the three rows of pixels relative to time with the rows of pixels being arranged in order, row by row from top to bottom with pixel row R1 being the top pixel row and pixel row R3 being the bottom pixel row shown in FIG. 4. Each of the individual pixels within each pixel row simultaneously receives the same data and therefore has a graph identical to the graph described above in FIG. 11 with the overall frame being divided into subframes with their corresponding blackout subframes as described above. However, the beginning of each of the pixel row graphs corresponding to pixel rows R1 through R3 are shifted timewise a predetermined amount successively from pixel row R1 to pixel row R2 and pixel row R2 to pixel row R3. This is because, as described above, the data writing arrangement writes each pixel row without the use of any buffer circuitry within the individual pixel subcircuits, and therefore takes a certain amount of time to write each pixel row. As described in detail above for the time domain scheme and the brightness domain schemes, for the overall display to function properly, all of the pixel rows in the array must be written within the time of any single subframe.

Although only one specific example of the hybrid scheme has been given, it should be understood that it may take on a wide variety of forms and still remain within the scope of the present invention. Any combination of the time domain scheme and either of the described brightness domain schemes may be envisioned. Also, although the example given provided thirty two levels of gray scale, it should be understood that the present invention is not limited to this number but instead, one of the reasons for using the hybrid scheme is to allow for a greater number of gray scale levels without requiring a subframe which is shorter than the time required for the FLC material to switch its ON/OFF state. Also, although the time domain subframes were described as doubling in length from subframe to subframe and the brightness domain subframes were described as doubling in brightness from subframe to subframe, it should be understood that this doubling is not a requirement of the present invention. Instead, the time differences from to subframe for the time domain scheme and the brightness difference and the time length for each subframe from subframe to subframe for the brightness domain may vary widely and still remain within the scope of the present invention.

Now that the data ordering schemes for obtaining gray scale have been described in detail, the data ordering schemes for obtaining a color version of a display designed in accordance with the present invention will be described. Again as will be described in more detail hereinafter, the speed of the FLC/VLSI spatial light modulator also permits color images to be displayed using data ordering techniques. In accordance with the present invention, this is done by first dividing the frames into subframes for purposes of obtaining color and by changing the color of the light directed into the FLC/VLSI spatial light modulator for each of the color subframes. These color subframes are further divided into sub-subframes for purposes of obtaining gray scale color. This arrangement for obtaining a color display has a potentially significant advantage over prior art display systems since the same FLC/VLSI spatial light modulator may be used for either a monochrome display or a color display. Only the illuminator arrangement and data ordering technique must be changed to create a color display. This arrangement also allows the entire pixel to be used for each of the various colors, and does not require the pixel to be subdivided into separate color specific subpixels as is the case for some types of displays, thereby improving the resolution. By not having to subdivide the pixels, the pixels may be made smaller, further improving resolution and the potential compactness of the display.

As will be described in more detail hereinafter, for a color display, each frame is first divided into subframes for purposes of obtaining color. During each of these subframes, the illuminator arrangement directs light of a preselected color into the spatial light modulator. For example, the frame may be divided into three subframes in which red light, green light, and blue light is successively directed into the modulator during its respective subframe. Each subframe is then divided into sub-subframes using the time domain, brightness domain, or hybrid data ordering schemes generally described above for purposes of obtaining gray scale for each color. Because of the frame rate, and because each of the colors is presented in the appropriate gray scale for each frame, the viewer's eye perceives the integrated colors and brightness of each frame, thereby perceiving the desired gray scale color image.

Figure 13:
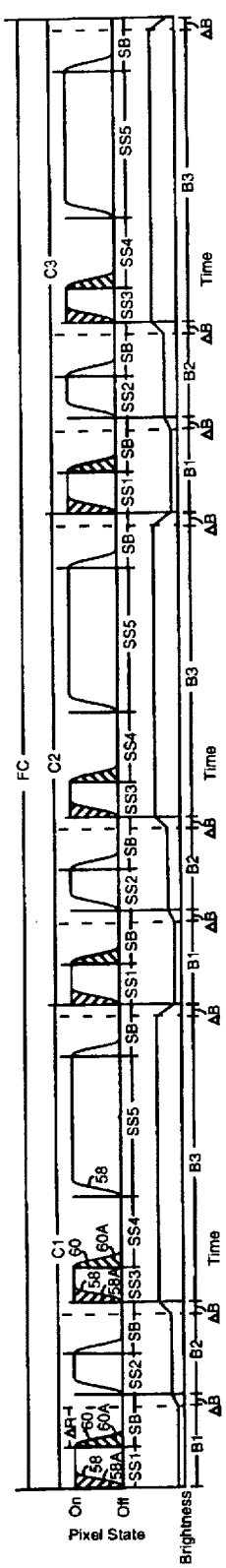
FIG. 13 is a graph illustrating the ON/OFF state of the pixel in the first row and first column of the array shown in FIG. 4 for a period of time equal to one frame with the frame being divided into subframes for purposes of obtaining color and each of the color subframes being divided into sub-subframes for purposes of obtaining gray scale color by controlling the ON/OFF state of the pixels during each subframe.
Figure 14:
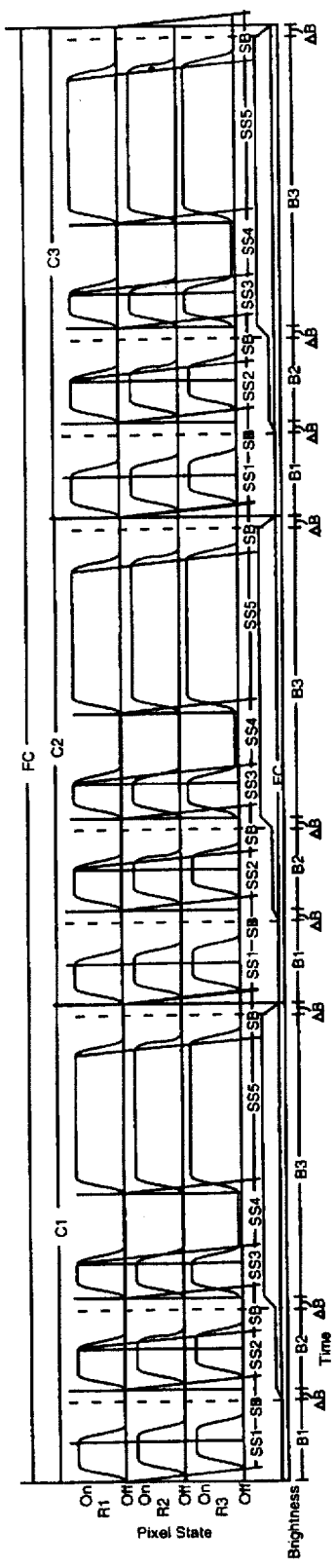
FIG. 14 is a graph illustrating the ON/OFF state of all of the pixel rows in the array shown in FIG. 4 for a period of time equal to one frame with the frame being divided into subframes for purposes of obtaining color and each of the color subframes being divided into sub-subframes for purposes of obtaining gray scale color by controlling the ON/OFF state of the pixels during each subframe using the hybrid scheme.

Referring to FIGS. 13 and 14, the operation of a color version of a display using the hybrid scheme will be described. In this embodiment of the present invention, frame FC is divided into three subframes C1, C2, and C3 for purposes of obtaining color. As was described above for switching the brightness of light, a blackout sub-subframe SB is used at the end of each color subframe in order to provide time to change the color of the light directed into the modulator without interfering with the proper gray scale levels for each color. In the case of the hybrid scheme, the blackout sub-subframe also allows the brightness to change if the first described brightness domain approach is used. As illustrated in FIG. 13, each color subframe is further divided into sub-subframes as described above for the frames of the hybrid scheme for purposes of obtaining color gray scale. Also as described above for the hybrid scheme, a blackout sub-subframe SB is used after each of the sub-subframes between which the brightness of the light is to be changed, providing time for the brightness of the colored light to be changed. Alternatively, as was described for the second brightness domain scheme, the blackout sub-subframes using the pixels themselves may be eliminated if the light is turned OFF during the time in which the array of pixels are being written and fully responding along with during the time the color of light directed into the array is changed.

As described above for each frame FH in FIG. 11, each color subframe C1 through C3 of FIG. 13 is divided into sub-subframes SS1 through SS5 which correspond to SH1 through SH5 in FIG. 11. Also, for this particular embodiment, as described for frame FH in FIG. 11, each color subframe of FIG. 13 includes three blackout sub-subframes SB positioned after sub-subframes SS1, SS2, and SS5 which are the sub-subframes after which the light directed into the pixel needs to be changed in either brightness or color. Each of these sub-subframes is of the length and has a brightness associated with it as was described above in detail for their associated subframes in FIG. 11 illustrating the hybrid scheme for obtaining gray scale.

With the above described arrangement of color subframes and gray scale sub-subframes, data writing arrangement 14 is able to write the pixel using a binary bit (i.e. a zero or a one) for each of the five sub-subframes and three blackout sub-subframes making up each of the three color subframes and therefore the overall frame FC. By controlling the ON/OFF state of the pixel during each of the sub-subframes and blackout sub-subframes of color subframes C1 through C3, thirty two gray scale levels of each of the three colors having equal changes in gray scale from level to level are provided. For example, as shown in FIG. 13, gray scale level 23 is obtained for each of the colors by having data writing arrangement 14 provide three series of eight binary bits 1-0-1-0-1-0-1-0 (one eight bit series for each color subframe) with the first bit of each series corresponding to its respective sub-subframe SS1, the second bit corresponding to blackout sub-subframe SB following SS1, and so on until the eighth bit of each series which corresponds to blackout sub-subframe SB following sub-subframe SS5 of each color subframe C1 through C3. Each of the other gray scale levels for each color is obtained using a similar series of eight bits with the pixel being turned ON during the appropriate sub-subframes.

In FIG. 14, the example given for a single color pixel operating using the hybrid scheme to obtain gray scale is expanded to illustrate the operation of the three pixel by three pixel array shown in FIG. 4. The graph in FIG. 14 illustrates the ON/OFF state of each of the rows of three pixels relative to time with the pixel rows being arranged in order, row by row from top to bottom with pixel row R1 being the top pixel row and pixel row R3 being the bottom pixel row shown in FIG. 4. Each of the individual pixels within each pixel row simultaneously receives the same data and therefore has a graph identical to the graph described above in FIG. 13 with the overall frame being divided into sub frames and each of the subframes being divided into sub-subframes with their corresponding blackout sub-subframes as described above. However, the beginning of each of the pixel rows graphs corresponding to pixel row R1 through R3 are shifted timewise a predetermined amount successively from pixel row R1 to pixel row R2 and pixel row R2 to pixel row R3. This is because, as described above, the data writing arrangement writes each pixel row without the use of any buffer circuitry within the individual pixel subcircuitry, and therefore takes a certain amount of time to write each pixel row. As described in detail above for the time domain scheme and the brightness domain scheme, for the overall display to function properly, all of the pixel rows in the array must be written within the time of any single sub-subframe.

In the above described example of a color version of the present invention using the hybrid scheme for obtaining gray scale for each color, thirty two levels of gray scale were provided. However, because of the speed at which the FLC material can switch, even broader gray scale levels may be achieved. For example, a frame rate of 60 frames per second provides for a frame lasting 16.7 milliseconds. If three colors are used, each color subframe would be approximately 5.5 milliseconds. Each color subframe may be divided according to the hybrid scheme of the present invention to provide, for example, 128 levels of gray scale (requiring 7 subframes) for each color using the brightness domain scheme for the two shortest or least significant sub-subframes and the time domain scheme for the remaining five sub-subframes. Using the FLC response time of 100 microseconds as the time for the shortest sub-subframes (this would include the two brightness domain sub-subframes and the shortest time domain sub-subframe), the longest time domain sub-subframe would be 1600 microseconds long (sixteen times as long as the shortest subframe). Therefore, this hybrid scheme would require approximately 3.9 milliseconds for each color subframe which is made up of two 100 microsecond brightness domain sub-subframes, two 200 microsecond blackout sub-subframes after each brightness domain sub-subframe for changing the brightness of the light, the five time domain sub-subframes (100, 200, 400, 800, and 1600 microseconds respectively), and a 200 microsecond blackout sub-subframe for changing the color of the light at the end of the color subframe. This required 3.9 milliseconds for this example is well within the 5.5 milliseconds available.

Figure 15:
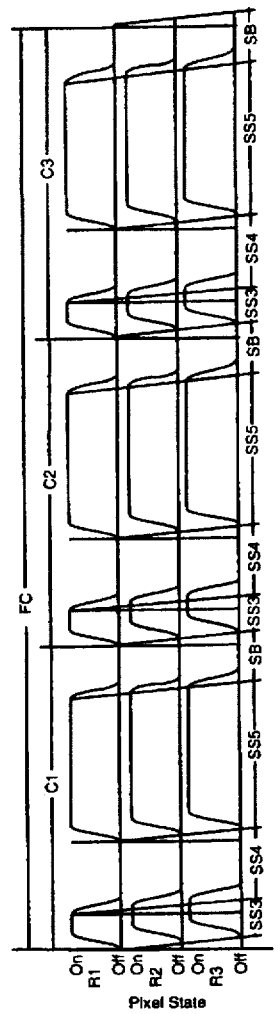
FIG. 15 is a graph illustrating the ON/OFF state of all of the pixel rows in the array shown in FIG. 4 for a period of time equal to one frame with the frame being divided into subframes for purposes of obtaining color and each of the color subframes being divided into sub-subframes for purposes of obtaining gray scale color by controlling the ON/OFF state of the pixels during each subframe using the time domain scheme only.

Referring now to FIG. 15, an alternative approach to producing a color system will be described. As shown in FIG. 15 and as described above for FIG. 13 and 14, each frame is divided into three color subframes C1, C2, and C3. However, in this approach, only the time domain scheme is used to further subdivide each color subframe into sub-subframes for purposes of obtaining color gray scale. As described above, in the preferred embodiment, each of the successive sub-subframes is twice as long as its previous sub-subframe, therefore, providing the linear gray scale as was described above in detail for the time domain scheme. As mentioned above for the other color versions, a blackout sub-subframe is provided at the end of each color subframe for changing the color of the light.

Although only two specific examples of a color version of the present invention have been given, it should be understood that it may take on a wide variety of forms and still remain within the scope of the present invention. Any combination of the time domain scheme and either of the described brightness domain schemes may be envisioned. In fact, the present invention contemplates a color version using only the time domain scheme (as described above) or only the brightness domain scheme for controlling the ON/OFF states of the pixels. Also, although the hybrid scheme example given provided thirty two levels of gray scale and the time domain scheme example provided eight levels of gray scale, it should be understood that the present invention is not limited to these numbers. In fact, the number of sub-subframes may be increased to provide any number of levels of gray scale and still remain within the scope of the present invention. However, one of the reasons for using the hybrid scheme, as was done in one of the examples given, is to allow for a greater number of gray scale levels. As mentioned above, this approach increases the number of sub-subframes which will fit within a given frame, compared to the time domain scheme alone, without requiring a subframe which is shorter than the time required for the FLC material to switch its ON/OFF state.

Figure 16A:
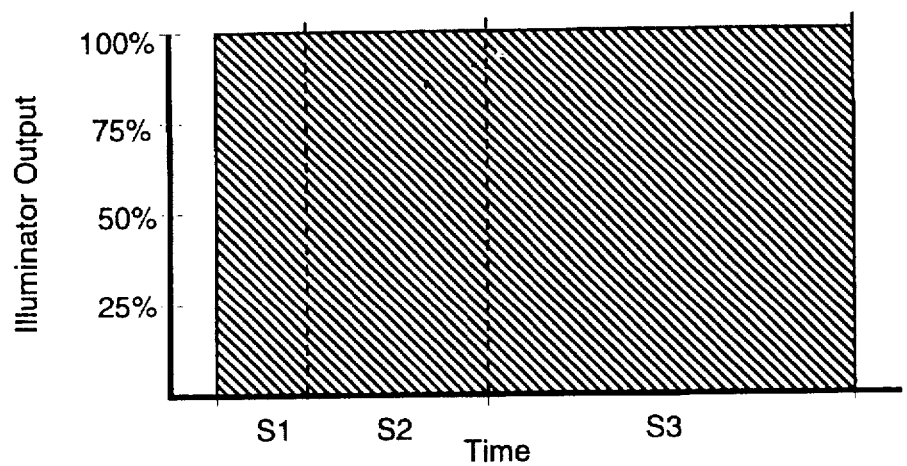
FIGS. 16A–C are graphs illustrating the illuminator output efficiencies for each of the various gray scale schemes shown in FIGS. 6, 8, and 12.
Figure 16B:
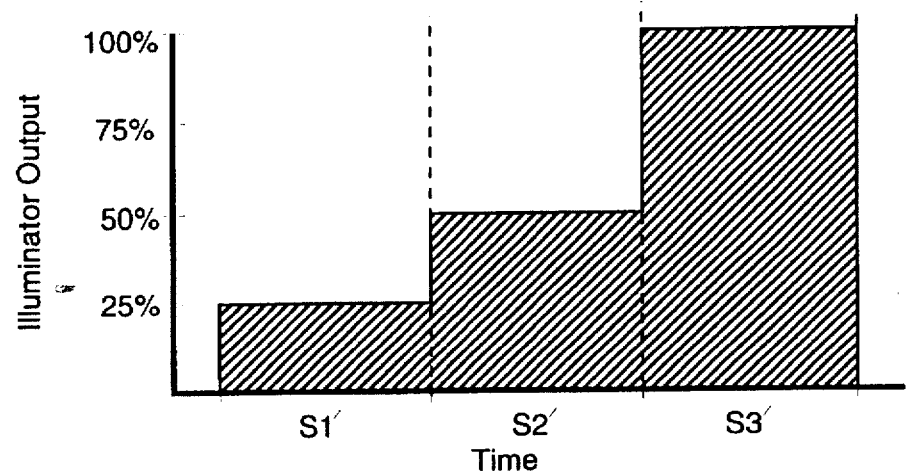
Figure 16C:
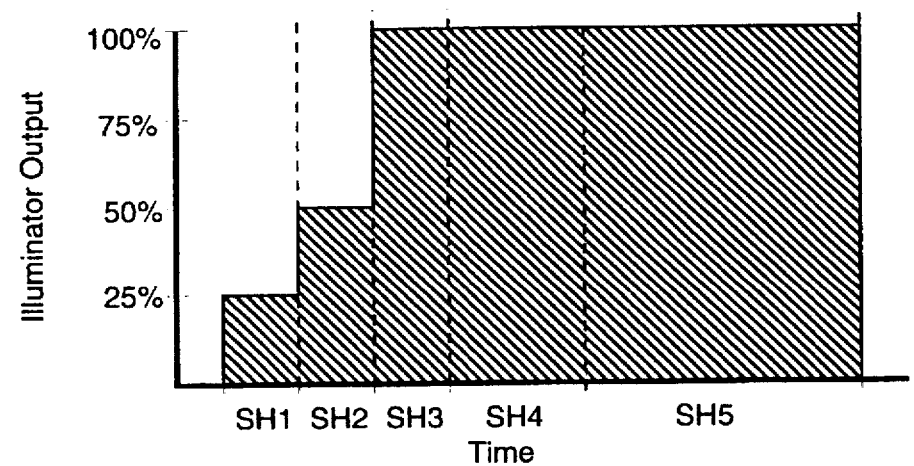

Referring now to FIGS. 16A–C, as mentioned above, another advantage of the hybrid system is that it allows the near full utilization of the available light directed into the spatial light modulator. FIGS. 16A–C illustrate the illuminator output for an FLC spatial light modulator pixel controlled by a five subframe arrangement using the time domain scheme, brightness domain scheme, and hybrid scheme, respectively. In FIG. 16A, for the time domain scheme, the illuminator is on at its maximum brightness throughout the operation of the pixel. Thus, the pixel's maximum brightness, as represented by the crosshatched area, is as high as possible. Although this provides excellent illuminator utilization, as described above, because each additional subframe added to obtain more levels of gray scale requires a subframe half as long as the next shortest subframe, this scheme can only be used up to a limited number of gray scale levels as mentioned above. In FIG. 16B, for the brightness domain scheme, the illuminator's brightness is cut by one half for each consecutive subframe. This under utilizes the potential of the illuminator and results in the pixel's maximum brightness being less than the illuminator is capable of providing. However, in FIG. 16C, for the hybrid scheme, the brightness domain approach is used for the first two subframes and the time domain approach is used for the remaining three subframes. This better utilizes the illuminator potential without having the problem of being restricted by the length of the shortest subframe.

While the embodiments illustrated throughout this disclosure have shown the subframes or sub-subframes being in a particular order, this is not a requirement of the present invention. For instance, in the case of the time domain scheme, the subframes were shown in order from shortest subframe to longest subframe. Also, in the case of the color system using the hybrid scheme, the color subframes and gray scale sub-subframes where shown in a particular order having all of the sub-subframes associated with one color grouped together in order from shortest to longest. However, the present invention would equally apply regardless of the order of the subframes and sub-subframes. For example, in the color system, the gray scale sub-subframes of different color subframes may be intermingled in any way so long as each of the sub-subframes is present within each overall frame.

Also, as described above, the present invention contemplates the use of FLC material as the preferred light modulating medium of the present invention. Present day technology in the field of FLC materials requires that in order to maintain a long life expectancy for the FLC material, the ON/OFF state of the material should be controlled such that the ON/OFF state of the material is balanced between the ON state and the OFF state. In other words, the state of the material should be ON in an equal amount of time as the state of the material is OFF. Applicants have found that certain novel approaches for balancing the ON/OFF state of the FLC material may be incorporated into the present invention to extend the life of the FLC material. These novel approaches are disclosed in copending U.S. patent application Ser. No. 08/361,775 Attorney Docket Number DIS1P006 entitled DC FIELD-BALANCING TECHNIQUE FOR AN ACTIVE MATRIX LIQUID CRYSTAL IMAGE GENERATOR filed cotemperaneously herewith, which application is incorporated herein by reference.

Although only a few specific embodiments of the present invention have been described in detail, it should be understood that the present invention may be embodied in many other specific forms without departing from the spirit or scope of the invention. For instance, although the present invention has been described as a miniature display, it is not limited to such a device, but instead is also particularly well suited to small portable hand held displays and larger very high resolution displays in which it is desirable to have a very high density of pixels. Alternatively, the present invention may be used for driving a printer, so long as the light-sensitive medium being printed on has the ability to integrate the modulated image of the present invention. In the case of a human viewing a display, the viewer's eye integrates the modulated image. In the case of the printer, the light sensitive medium itself will by means of integration respond to the gray scale levels provided by the device designed in accordance with the present invention Also, it should be understood that the present invention may be embodied in the form of a projection display or may drive other devices which use optical images as their input.

Furthermore, as mentioned above, although the data writing arrangement has been described throughout this description as writing the pixels row by row, this is not a requirement of the present invention. Instead, the pixels may be written in any desired sequence whether that is individual pixel by pixel, column by column, or some other sequence of specific groups of pixels. Also, although only one specific version of the hybrid scheme and the color version of the display using the hybrid scheme have been described, it should be understood the hybrid scheme and the color version of the display may incorporate a wide variety of combinations of the basic time domain scheme and either of the brightness domain approaches depending on the requirements of the specific embodiment without departing from the spirit or scope of the present invention.

Therefore, the present examples are to be considered as illustrative and not restrictive, and the invention is not to be limited to the details given herein, but may be modified within the scope of the appended claims.

What is claimed is:

1. A system for producing modulated light having gray scale, said system comprising:
   (a) an active matrix liquid crystal spatial light modulator having
      (i) light modulating means including a layer of ferroelectric liquid crystal material which is designed to switch between ON and OFF states, and
      (ii) active matrix means including VLSI circuitry for dividing said layer of liquid crystal material into an array of individual liquid crystal pixels and for causing each of said pixels of liquid crystal material to modulate light individually by switching between said ON and OFF states in a way that depends upon the data which the VLSI circuitry is written, said VLSI circuitry of said active matrix means including an array of subcircuits, each subcircuit of which is dedicated to and defines a specific one of said pixels, said active matrix means dividing said layer of liquid crystal material into an array of immediately adjacent pixels, each of which has a maximum light modulating area of at most 100 square microns, said layer of ferroelectric liquid crystal material being maintained at a substantially uniform thickness of at most approximately 2 microns, whereby the size of said pixels can be made smaller than would be the case if the layer of liquid crystal were much thicker, for example of the order of 6 microns as required by nematic liquid crystal material in spatial light modulators;
   (b) illumination means including a light source for directing light from said source into said pixel-divided layer of ferroelectric liquid crystal material in a specific way; and
   (c) means for writing said VLSI circuitry with preselected data in accordance with a particular data ordering scheme such that said circuitry, in response to the data, causes said pixels of liquid crystal material to individually switch between their ON and OFF states and therefore modulate light from said source in a way which, depending upon said data, produces a specific overall pattern of gray scale light, said particular data ordering scheme being such that said data writing means writes each of said subcircuits, and therefore each of said pixels, with preselected data in a predetermined successive order, timewise, such that none of said subcircuits require auxiliary data storage buffer circuitry and therefore the complexity of said array of subcircuits can be reduced.

2. A system according to claim 1 wherein each of said pixels is square shaped, at most 10 microns on a side.

3. A system according to claim 1 wherein each of said subcircuits includes one and only one active component for modulating its associated pixel.

4. A system according to claim 3 wherein said active component of each subcircuit is a transistor.

5. A system according to claim 1 wherein said preselected data is digital data divided into individual digital data commands, one for each of said subcircuits and therefore each of said pixels, during any given time frame, each digital data command establishing the length of time its associated pixel is in its ON and OFF state during a given time frame.

6. A system according to claim 5 wherein each of said digital data commands establishes whether its associated pixel is in its ON or OFF state during each subframe of any given frame, whereby whether any given pixel is in its ON or OFF state during the various subframes of a given time frame determines the overall gray scale of that pixel during that time frame.

7. A system according to claim 6 wherein each of said digital commands comprises a series of binary bits, one bit for each of said subframes, each binary bit establishing whether its associated pixel is in its ON or OFF state during its associated subframe.

8. A system according to claim 5 wherein each of said given time frames is divided into a plurality of subframes for purposes of obtaining color, wherein each of said subframes is divided into a plurality of sub-subframes of predetermined time periods for purposes of obtaining colored gray scale, wherein said illumination means includes means for alternatively directing light of different colors, equal in number to the number of said subframes, into said pixel-divided layer of liquid crystal material during each successive subframe of each frame, and wherein each of said digital data commands establishes whether its associated pixel is in its ON or OFF state during each subframe and sub-subframe of any given frame, whereby whether any given pixel is in its ON or OFF state during the various subframes and sub-subframes of a given time frame determines the overall gray scale and color of that pixel during that time frame.

9. A system according to claim 8 wherein each of said digital commands comprises a series of binary bits, one for each of said sub-subframes, each binary bit establishing whether its associated pixel is in its ON or OFF state during its associated sub-subframe.

10. A system according to claim 9 wherein each of said subframes includes an additional blackout subframe after each of said first-mentioned subframes and wherein each of said digital data commands includes a binary bit associated with each of said blackout subframes for maintaining its associated pixel in an OFF state during its associated blackout subframe, each of said blackout subframes being sufficiently long to allow all of the pixels written during each immediately previous subframe to respond fully and to allow said illumination means to switch colors before the writing means begins writing the pixels in the next subframe.

11. A system according to claim 1 wherein the duration of the subframes, if arranged in order of duration, increase by a factor of two.

12. A system according to claim 1 wherein said illumination means including said light source includes means for directing light of different colors into said pixel-divided layer of ferroelectric liquid crystal material in a specific way so as to produce modulated colored light having gray scale and a polarizer/analyzer designed to pass light across a broad color band including light of said different colors.

13. A system according to claim 1 wherein said illumination means includes at least one light emitting diode serving as said light source.

14. A system according to claim 13 wherein said light emitting diode is the sole source of light of said illumination means.

15. A system according to claim 13 wherein said illumination means includes at least three light emitting diodes serving as said light source, each of which is a different color from the others.

16. A system according to claim 15 wherein said three light emitting diodes are red, green and blue light emitting diodes.

17. A system according to claim 1 including means for viewing the light modulated by said layer of liquid crystal material, whereby said system serves as a light display.

18. A system for producing modulated light having gray scale, said system comprising:

(a) an active matrix liquid crystal spatial light modulator having
  (i) light modulating means including a layer of ferroelectric liquid crystal material which is designed to switch between ON and OFF states, and
  (ii) active matrix means including VLSI circuitry for dividing said layer of liquid crystal material into an array of individual liquid crystal pixels and for causing each of said pixels of liquid crystal material to modulate light individually by switching between said ON and OFF states in a way that depends upon the data which the VLSI circuitry is written, said VLSI circuitry of said active matrix means including an array of subcircuits, each of which is dedicated to and defines a specific one of said pixels, said layer of ferroelectric liquid crystal material being maintained at a substantially uniform thickness of at most approximately 2 microns, whereby the size of said pixels can be made smaller than would be the case if the layer of liquid crystal were much thicker, for example of the order of 6 microns as required by nematic liquid crystal material in spatial light modulators;

(b) illumination means including a light source for directing light from said source into said pixel-divided layer of ferroelectric liquid crystal material; and (c) means for writing said VLSI circuitry with preselected data in accordance with a particular data ordering scheme such that said circuitry, in response to the data, causes said pixels of liquid crystal material to individually switch between their ON and OFF states for a plurality of subframes which make up a given time frame and therefore modulate light from said source in a way which, depending upon said data, produces a specific overall pattern of gray scale light, said particular data ordering scheme being such that said data writing means writes each of said subcircuits and therefore each of said pixels with preselected data in a predetermined successive order, timewise, such that none of said subcircuits require auxiliary data storage buffer circuitry and therefore the complexity of said array of subcircuits can be reduced.

19. A system according to claim 18 wherein said active matrix means divides said layer of liquid crystal material into an array of immediately adjacent pixels, each of which has a maximum light modulating area of at most 100 square microns.

20. A system according to claim 19 wherein each of said pixels is square shaped, at most 10 microns on a side.

21. A system according to claim 18 wherein each of said subcircuits includes one and only one active component for modulating its associated pixel.

22. A system according to claim 21 wherein said active component of each subcircuit is a transistor.

23. A system according to claim 18 wherein said preselected data is digital data divided into individual digital data commands, one for each of said subcircuits and therefore each of said pixels, during any given time frame, each digital data command establishing the length of time its associated pixel is in its ON and OFF state during a given time frame.

24. A system according to claim 23 wherein each of said digital commands comprises a series of binary bits, one bit for each of said subframes, each binary bit establishing whether its associated pixel is in its ON or OFF state during its associated subframe.

25. A system according to claim 24 wherein:
   (a) said illumination means includes means for directing light of different intensities from said light source into said pixel-divided layer of ferroelectric liquid crystal material,
   (b) each of said frames includes an additional blackout subframe between each of said first-mentioned subframes; and
   (c) each of said digital data commands includes a binary bit associated with each of said blackout subframes for maintaining its associated pixel in an OFF state during its associated blackout subframe, each of said blackout subframes being sufficiently long to allow all of the pixels written during each immediately previous first-mentioned subframe to fully respond and to allow said illumination means to switch the intensity of said light source before the writing means begins writing the pixels in the next first-mentioned subframe.

26. A system according to claim 18 wherein said plurality of subframes is a plurality of subframes of equal time periods.

27. A system according to claim 18 wherein each of said given time frames is divided into a plurality of color subframes for purposes of obtaining color, wherein each of said color subframes is divided into a plurality of sub-subframes of predetermined time periods for purposes of obtaining colored gray scale, wherein said illumination means includes means for alternatively directing light of different colors, equal in number to the number of said subframes, into said pixel-divided layer of liquid crystal material during each successive subframe of each frame, and wherein each of said digital data commands establishes whether its associated pixel is in its ON or OFF state during each color subframe and sub-subframe of any given frame, whereby whether any given pixel is in its ON or OFF state during the various color subframes and sub-subframes of a given time frame determines the overall gray scale and color of that pixel during that time frame.

28. A system according to claim 27 wherein each of said digital commands comprises a series of binary bits, one for each of said sub-subframes, each binary bit establishing whether its associated pixel is in its ON or OFF state during its associated sub-subframe.

29. A system according to claim 28 wherein each of said color subframes includes an additional blackout subframe after each of said first-mentioned color subframes and wherein each of said digital data commands includes a binary bit associated with each of said blackout subframes for maintaining its associated pixel in an OFF state during its associated blackout subframe, each of said blackout subframes being sufficiently long to allow all of the pixels written during each immediately previous color subframe to respond fully and to allow said illumination means to switch colors before the writing means begins writing the pixels in the next color subframe.

30. A system according to claim 18 wherein said illumination means including said light source includes means for directing light of different colors into said pixel-divided layer of ferroelectric liquid crystal material in a specific way so as to produce modulated colored light having gray scale and a polarizer/analyzer designed to pass light across a broad color band including light of said different colors.

31. A system according to claim 18 wherein said illumination means includes at least one light emitting diode serving as said light source.

32. A system according to claim 31 wherein said light emitting diode is the sole source of light of said illumination means.

33. A system according to claim 31 wherein said illumination means includes at least three light emitting diodes serving as said light source, each of which is a different color from the others.

34. A system according to claim 33 wherein said three light emitting diodes are red, green and blue light emitting diodes.

35. A system according to claim 18 including means for viewing the light modulated by said layer of liquid crystal material, whereby said system serves as a light display.

36. A system for producing modulated light having gray scale during a given period of time comprising:
   (a) a spatial light modulator including a plurality of light modulating pixels switchable between different states so as to act on light in different ways during a plurality of light modulating subperiods making up said period of time said pixels being arranged in specific groups of said pixels;
   (b) illumination means for directing light of either different brightnesses or different colors alternately and successively into said light modulating pixels during predetermined ones of said light modulating subperiods of said period; and
   (c) switching means, responsive to preselected data signals, for switching said pixels to certain light modulating states in a controlled way during each light modulating subperiod of said period in order to modulate said light directed into said light modulating pixels during said light modulating subperiods, said switching means including means for simultaneously switching each of said groups of pixels, one group at a time, during each of said subperiods, said period further including a blackout subperiod during which said switching means switches all of said pixels to an OFF state in response to said preselected data signals in order to black out said light directed into said pixels thereby allowing either the brightness or the color of said light directed into said pixels by said illumination means to be changed without effecting the gray scale of said modulated light during said period.

37. A system according to claim 36 wherein said pixels are arranged in rows and columns and wherein said specific groups consist of the rows making up said rows and columns.

38. A system according to claim 36 wherein said light modulating subperiods making up said time period are unequal in duration.

39. A system according to claim 38 wherein said light modulating subperiods making up said time period, if arranged in order of duration, would double in duration from light modulating subperiod to light modulating subperiod.

40. A system according to claim 36 wherein said light modulating pixels include a ferroelectric liquid crystal light modulating material.

41. A system according to claim 36 wherein said switching means includes active matrix VLSI circuitry.

42. A method of producing modulated light having gray scale during a given period of time, the method comprising the steps of:

(a) providing a spatial light modulator including a plurality of light modulating pixels switchable between different states so as to act on light in different ways during a plurality of light modulating subperiods making up said period of time, said pixels being arranged in specific groups of said pixels;

(b) directing light of either different brightnesses or different colors alternately and successively into said light modulating pixels during predetermined ones of said light modulating subperiods of said period;

(c) in response to preselected data signals, switching said pixels to certain light modulating states in a controlled way during each light modulating subperiod of said period in order to modulate said light directed into said light modulating pixels during said light modulating subperiods, each of said groups of pixels being switched into their light modulating states, one group at a time during each of said subperiods; and (d) in response to said preselected data signals, switching all of said pixels to an OFF state during a blackout subperiod in order to black out said light directed into said pixels thereby allowing either the brightness or the color of said light directed into said pixels to be changed without effecting the gray scale of said modulated light during said period.

43. A method according to claim 42 wherein said pixels are arranged in rows and columns and wherein said specific groups consist of the rows making up said rows and columns.

44. A method according to claim 42 wherein said light modulating subperiods making up said time period are unequal in duration.

45. A method according to claim 44 wherein said light modulating subperiods making up said time period, if arranged in order of duration, would double in duration from light modulating subperiod to light modulating subperiod.

46. A method according to claim 42 wherein said light modulating pixels include a ferroelectric liquid crystal light modulating material.

47. A method according to claim 42 wherein said step of switching said pixels includes the step of switching said pixels using active matrix VLSI circuitry.

48. A method of displaying gray scale or color images, the method comprising the steps of:

(a) providing an array of light modulating pixels organized in rows, each pixel being switchable between a first pixel state and a second blackout pixel state in response to input data;

(b) switching all of said pixels to said second blackout pixel state;

(c) after all of said pixels have been switched to said second blackout pixel state, illuminating said array of pixels with light of a first desired brightness and color;

(d) while said array of pixels is being illuminated with said desired brightness and color of light, switching the states of said pixels in each of said rows such that said array of pixels forms a desired pattern of modulated light, at least some of said rows of pixels being switched at different times from other ones of said rows;

(e) switching all of said pixels to said second blackout pixel state a second time in such a manner that the time interval between the time at which the states of the pixels in each row are switched to form said desired pattern of modulated light and the time at which that row is switched to said second blackout pixel state said second time is the same for each row of pixels; and (f) after all of said pixels have been switched to said second blackout pixel state said second time, illuminating said array of pixels with light of a second desired brightness and color.

49. A method according to claim 48 wherein said steps of switching said pixels includes the step of switching said pixels one row at a time.

50. A method according to claim 48 wherein the step of switching the states of said pixels in each of said rows such that said array of pixels forms a desired pattern of modulated light includes the step of switching the states of said pixels in each of said rows a plurality of times such that said array of pixels forms a desired pattern of modulated light.

51. A method according to claim 50 wherein the pixels are switchable between only said first and second pixel states.

52. A method according to claim 48 wherein said array of pixels is an active matrix array of pixels including an array of subcircuits, each subcircuit of which is dedicated to and defines a specific one of said pixels, said array of subcircuits being configured such that none of said subcircuits require auxiliary data storage buffer circuitry for storing said input data in order to use said input data to switch the states of said pixels and therefore the complexity of said array of subcircuits can be reduced.

53. A method according to claim 52 wherein the steps of illuminating said array of pixels includes the step of illuminating the array of pixels with polarized light of a particular polarization and wherein said array of pixels is an array of light modulating pixels that modulate the polarization of the light between a first polarization state when said pixels are switched to said first pixel state and a second polarization state when said pixels are switched to said second pixel state.

54. A method according to claim 48 wherein said array of pixels is an array of pixels including a layer of ferroelectric liquid crystal material that acts as a light modulating medium switchable between said first and second states.

55. A method according to claim 48 wherein said second blackout pixel state is a pixel state which prevents any of the light illuminating any pixel switched to the blackout pixel state from contributing to the image.

56. A method according to claim 48 wherein said steps of illuminating said array of pixels includes the step of using at least one individually controllable light emitter which emits light of a predetermined color to illuminate said array of pixels.

57. A method according to claim 48 wherein said steps of illuminating said array of pixels includes the step of using a broad spectrum light source and a color wheel to illuminate said array of pixels.

* * * * *